(12) United States Patent
Zhang

(10) Patent No.: US 12,079,396 B2
(45) Date of Patent: *Sep. 3, 2024

(54) DISPLAY APPARATUS AND METHOD

(71) Applicant: Hisense Visual Technology Co., Ltd., Shandong (CN)

(72) Inventor: Zhiyong Zhang, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,585

(22) Filed: Apr. 7, 2023

(65) Prior Publication Data

US 2023/0244322 A1 Aug. 3, 2023

Related U.S. Application Data

(63) Continuation of application No. 17/456,416, filed on Nov. 24, 2021, now Pat. No. 11,650,669, which is a
(Continued)

(30) Foreign Application Priority Data

| Dec. 18, 2019 | (CN) | 201911311386.7 |
| Dec. 18, 2019 | (CN) | 201911312629.9 |
| Dec. 18, 2019 | (CN) | 201911312771.3 |

(51) Int. Cl.
*G06F 3/01* (2006.01)
*G06F 3/04847* (2022.01)
(Continued)

(52) U.S. Cl.
CPC .......... *G06F 3/017* (2013.01); *G06F 3/04847* (2013.01); *H04N 21/4222* (2013.01); *H04N 21/4852* (2013.01); *H04N 21/4854* (2013.01)

(58) Field of Classification Search
CPC .. G06F 3/017; G06F 3/04847; G06F 3/04897; G06F 3/016; H04N 21/4222;
(Continued)

(56) References Cited

U.S. PATENT DOCUMENTS

| 6,552,738 B1 * | 4/2003 | Lin ..................... G06F 3/04847 715/810 |
| 11,650,669 B2 * | 5/2023 | Zhang ................. G06F 3/04847 345/156 |

(Continued)

FOREIGN PATENT DOCUMENTS

| CN | 101650931 A | 2/2010 |
| CN | 102111584 A | 6/2011 |

(Continued)

OTHER PUBLICATIONS

Chinese Office Action, mailed Oct. 22, 2020, for CN201911312771.3 filed Dec. 18, 2019.
(Continued)

*Primary Examiner* — Grant Sitta
(74) *Attorney, Agent, or Firm* — Workman Nydegger

(57) ABSTRACT

Embodiments of the present disclosure relate to a display apparatus. The display apparatus includes: a display; a user interface; and a controller, configured to perform: in response to a user input, synchronizing menu content data set under a current source to other sources, so that the other sources can obtain the same display effect as that under the current source. Unnecessary repeated setting is avoided, and convenience is brought to users in use.

20 Claims, 35 Drawing Sheets

Related U.S. Application Data continuation of application No. PCT/CN2020/087167, filed on Apr. 27, 2020.

(51) Int. Cl.
*H04N 21/422* (2011.01)
*H04N 21/485* (2011.01)

(58) Field of Classification Search
CPC ............ H04N 21/4852; H04N 21/4854; H04N 21/4622
See application file for complete search history.

(56) References Cited

U.S. PATENT DOCUMENTS

| | | |
|---|---|---|
| 2008/0178214 A1 | 7/2008 | Shivajo-Rao |
| 2010/0020238 A1 | 1/2010 | Kim et al. |
| 2015/0036052 A1 | 2/2015 | Tabuchi et al. |
| 2016/0173931 A1 | 6/2016 | Eber et al. |

FOREIGN PATENT DOCUMENTS

| | | |
|---|---|---|
| CN | 102630383 A | 8/2012 |
| CN | 103686422 A | 3/2014 |
| CN | 103731752 A | 4/2014 |
| CN | 105516803 A | 4/2016 |
| CN | 106254921 A | 12/2016 |
| CN | 106254937 A | 12/2016 |
| CN | 106791865 A | 5/2017 |
| CN | 111050197 A | 4/2020 |

OTHER PUBLICATIONS

Chinese Office Action, mailed Sep. 1, 2020, from CN201911312629.9 filed Dec. 18, 2019.
Chinese Office Action, mailed Oct. 22, 2020, from CN201911311386.7 filed Dec. 18, 2019.
International Search Report, mailed Sep. 17, 2020, from PCT/CN2020/087167 filed Apr. 27, 2020.

\* cited by examiner

DISPLAY APPARATUS AND METHOD

CROSS REFERENCE OF RELATED APPLICATIONS

The application is a continuation of U.S. application Ser. No. 17/456,416 filed Nov. 24, 2021, which is a continuation of International Application No. PCT/CN2020/087167 filed Apr. 27, 2020, which claims priorities to the Chinese Patent Application No. 201911312629.9, filed on Dec. 18, 2019, Chinese Patent Application No. 201911312771.3, filed on Dec. 18, 2019 and the Chinese Patent Application No. 201911311386.7, filed on Dec. 18, 2019. The entire disclosures of the above applications are incorporated herein by reference.

FIELD

The present disclosure relates to display technology, in particular to a display apparatus.

BACKGROUND

The display apparatus provides users with playing pictures such as audio, video, pictures, etc., and is widely used in daily work and life. In an actual use process, the users adjust display effects of the pictures according to personal preferences. The users' adjustments for the pictures are only applicable to a content input from a current source. If the users switch from the current source to other sources, in order to achieve the same display effect, the other sources need to be readjusted. This brings inconvenience to the users.

SUMMARY

The application provides a display apparatus used for synchronizing menu data adjusted by a user to other sources, so that unnecessary repeated setting is avoided, and convenience is brought to users in use.

The disclosure provides a display apparatus, including: a display; a user input interface, configured to receive a user input; an external device interface, configured to connect with an external device that provides content; a network connection component, configured to browse and/or download content from a network; a controller, configured to: while a content provided by a first input source is displaying on the display, in response to a user input for showing a setting menu of display parameters, present a first graphical user interface that includes the setting menu of display parameters on the display; in response to a user input for modifying at least one display parameter in the first graphical user interface, modify data of the at least one display parameter and store the modified data associated with the at least one display parameter in the first input source; in response to a user input for selecting a first function option in the first graphical user interface, synchronously write and store data of current setting of all the display parameters in the first graphical user interface in other input sources except the first input source; in response to a user input for modifying a display parameter in the first graphical user interface again, modify data of the display parameter and synchronously write and store the modified data of the display parameter in all the input sources; in response to a user input for switching to a second input source, control switching from the first input source to the second input source and display a content provided by the second input source; and in response to a user input for showing a setting menu of the display parameters, present a second graphical user interface that includes the setting menu of display parameters on the display; wherein data of the second graphical user interface is the same as the data of all the display parameters after the modification of the first display parameter in the first graphical user interface.

The disclosure provides a display apparatus, including: a display, configured to display a first graphical user interface including a setting menu of display parameters; a user input interface, configured to receive a user input; a controller, configured to: in a first picture mode, in response to a user input for modifying at least one display parameter in the first graphical user interface, modify data associated with the at least one display parameter, and store the modified data in the first picture mode; in response to a user input for selecting a first function option in the first graphical user interface, synchronously write and store data of current setting of all the display parameters in the first graphical user interface in other picture modes except the first picture mode; in response to a user input for switching to a second picture mode, control switching from the first picture mode to the second picture mode; and in response to a user input for showing a setting menu of display parameters, display a second graphical user interface that includes the setting menu of display parameters; wherein data of the second graphical user interface is the same as the data of current setting of all the display parameters in the first graphical user interface.

The disclosure provides a display apparatus, including: a display, configured to display a first graphical user interface including a setting menu of display parameters; a user input interface, configured to receive a user input; a controller, configured to: in a first picture mode, in response to a user input for selecting a first function option in the first graphical user interface, synchronously write and store data of current setting of all the display parameters in the first graphical user interface in other picture modes except the first picture mode; in response to a user input for modifying a display parameter in the first graphical user interface, modify data of the display parameter and synchronously write and store the modified data of the display parameter in all the picture modes; in response to a user input for modifying the display parameter again, modify the data of the display parameter and synchronously write and store the data of the display parameter modified again in all the picture modes; in response to a user input for switching to a second picture mode, control switching from the first picture mode to the second picture mode; and in response to a user input for showing a setting menu of display parameters, display a second graphical user interface that includes the setting menu of display parameters; wherein data of the second graphical user interface is the same as the data of all the display parameters after the modification of the first display parameter in the first graphical user interface.

The disclosure provides a display apparatus, including: a display, configured to display a first graphical user interface that includes a setting menu of display parameters; a user input interface, configured to receive a user input; a controller, configured to: under a first input source, in response to a user input for modifying at least two display parameters in the first graphical user interface, modify data of the at least two display parameters and store the data in the first input source; in response to a user input for selecting a first function option in the first graphical user interface, synchronously write and store data of all the display parameters in the first graphical user interface in other input sources except the first input source; in response to a user input for modifying a display parameter in the first graphical user interface, modify data of the display parameter and store the data of the display parameter in the first input source; in response to a user input for modifying the display parameter again, modify the data of the display parameter and store the data of the display parameter in the first input source; in response to a user input for modifying other display parameters except the display parameter, modify data of the other display parameters and store the data in the first input source, and synchronously write and store the data of the display parameter modified again in other input sources except the first input source; in response to a user input for switching to a second input source, control switching from the first input source to the second input source and display service contents provided by the second input source; and in response to a user input for showing a setting menu of display parameters, display a second graphical user interface that includes the setting menu of display parameters; wherein data of the second graphical user interface is the same as current setting data of the display parameters in the first graphical user interface.

The disclosure provides a display apparatus, including: a display, configured to display a first graphical user interface that includes a setting menu of display parameters; wherein the first graphical user interface includes a selector indicating that a display parameter is selected; a user input interface, configured to receive a user input; a controller, configured to: under a first input source, when the selector is detected to select one display parameter in the first graphical user interface, in response to a user input for modifying the one display parameter, modify data of the one display parameter and store the data in the first input source; when the selector is detected to select a first function option in the first graphical user interface, in response to a user input for activating the first function option, synchronously write and store data of all the display parameters in the first graphical user interface in other input sources except the first input source; when the selector is detected to select another display parameter in the first graphical user interface, in response to a user input for modifying the another display parameter, modify data of the another display parameter and store the data in the first input source; in response to a user input for modifying the another display parameter again, modify the data of the another display parameter and store the modified data again in the first input source; when the selector is detected to no longer select the another display parameter, synchronously write and store the data of the another display parameter modified again in other input sources except the first input source; in response to a user input for switching to a second input source, control switching from the first input source to the second input source and display service contents provided by the second input source; and in response to a user input for showing a setting menu of display parameters, display a second graphical user interface that includes the setting menu of display parameters; wherein data of the second graphical user interface is the same as the current setting data of the displaying parameters in the first graphical user interface.

The disclosure provides a display apparatus, including: a display, configured to display a first graphical user interface that includes a setting menu of display parameters; wherein the first graphical user interface includes a selector indicating that a display parameter is selected; a user input interface, configured to receive a user input; a controller, configured to: in a first picture mode, when the selector is detected to select a first function option in the first graphical user interface, in response to a user input for activating the first function option, synchronously write and store data of current setting of all display parameters in the first graphical user interface in other picture modes except the first picture mode; when the selector is detected to select one display parameter in the first graphical user interface, in response to a user input for modifying the one display parameter, modify data of the one display parameter and store the modified data in the first picture mode; when the selector is detected to no longer select the one display parameter, synchronously write and store the modified data of the one display parameter in other picture modes except the first picture mode; in response to a user input for switching to a second picture mode, control switching from the first picture mode to the second picture mode; and in response to a user input for showing a setting menu of display parameters, display a second graphical user interface that includes the setting menu of display parameters; wherein data of the second graphical user interface is the same as current setting data of the display parameters in the first graphical user interface.

The disclosure provides a display apparatus, including: a display; a user input interface, configured to receive a user input; a network connection component, configured to browse and/or download content from a server that provides contents; an external device interface, configured to connect with an external device that provides contents; a controller, configured to: while a content provided by a first input source is displaying on the display, in response to a user input for showing a setting menu of display parameters, present a first graphical user interface that includes the setting menu of display parameters on the display; in response to a user input for modifying at least two display parameters in the first graphical user interface, modify data of the at least two display parameters and store the modified data associated with the at least two display parameters in the first input source; in response to a user input for selecting a first function option in the first graphical user interface and a user input for exiting the first graphical user interface, synchronously write and store data of current setting of all the display parameters in the first graphical user interface in other input sources except the first input source and exit the first graphical user interface; in response to a user input for switching to a second input source, control switching from the first input source to the second input source and display a content provided by the second input source; and in response to the user input of the setting menu of display parameters, display a second graphical user interface that includes the setting menu of display parameters; wherein data of the second graphical user interface is the same as the data of current setting of all the display parameters in the first graphical user interface.

The disclosure provides a display apparatus, including: a display, configured to display a first graphical user interface including a setting menu of display parameters; a user input interface, configured to receive a user input; a controller, configured to: under a first input source, in response to a user input for modifying at least two display parameters in the first graphical user interface, modify data of the at least two display parameters and store the data in the first input source; in response to a user input for selecting a first function option in the first graphical user interface, synchronously write and store data of display parameters in other input sources except the first input source; in response to a user input for modifying one display parameter in the first graphical user interface, modify data of the one display parameter and store the data in the first input source; in response to a user input for modifying the one display parameter again, modify the data of the one display parameter and store the modified data again in the first input source; in response to a user input for exiting the first graphical user interface, synchronously write and store data of current setting of all the display parameters in the first graphical user interface in other input sources except the first input source and exit the first graphical user interface; in response to a user input for switching to a second input source, control switching from the first input source to the second input source; and in response to the user input for showing a setting menu of display parameters, display a second graphical user interface that includes the setting menu of display parameters; wherein data of the second graphical user interface is the same as the data of current setting of all the display parameters in the first graphical user interface.

The disclosure provides a display apparatus, including: a display, configured to display a first graphical user interface that includes a setting menu of display parameters; a user input interface, configured to receive a user input; a controller, configured to: under a first picture mode, in response to a user input for modifying at least two display parameters in the first graphical user interface, modify data of the at least two display parameters and store the data in the first picture mode; in response to a user input for selecting a first function option in the first graphical user interface, synchronously write and store data of display parameters in other picture modes except the first picture mode; in response to a user input for modifying one display parameter in the first graphical user interface again, modify data of the one display parameter and store the data of the one display parameter modified again in the first picture mode; in response to a user input for exiting the first graphical user interface, synchronously write and store data of current setting of all the display parameters in the first graphical user interface in other picture modes except the first picture mode and exit the first graphical user interface; in response to a user input for switching to a second picture mode, control switching from the first picture mode to the second picture mode; and in response to the user input for showing a setting menu of display parameters, display a second graphical user interface that includes the setting menu of display parameters; wherein data of the second graphical user interface is the same as the data of current setting of all the display parameters in the first graphical user interface.

DETAILED DESCRIPTION OF THE EMBODIMENTS

In order to make objectives, implementations and advantages of the present application more apparent, the present application will be described in further detail below with reference to the accompanying drawings, and it will be apparent that the described embodiments are only some, but not all, embodiments of the present application. Based on the embodiments in the present application, all other embodiments obtained by those of ordinary skill in the art without inventive step shall fall within the scope of the claims of the present disclosure.

Figure 1A:
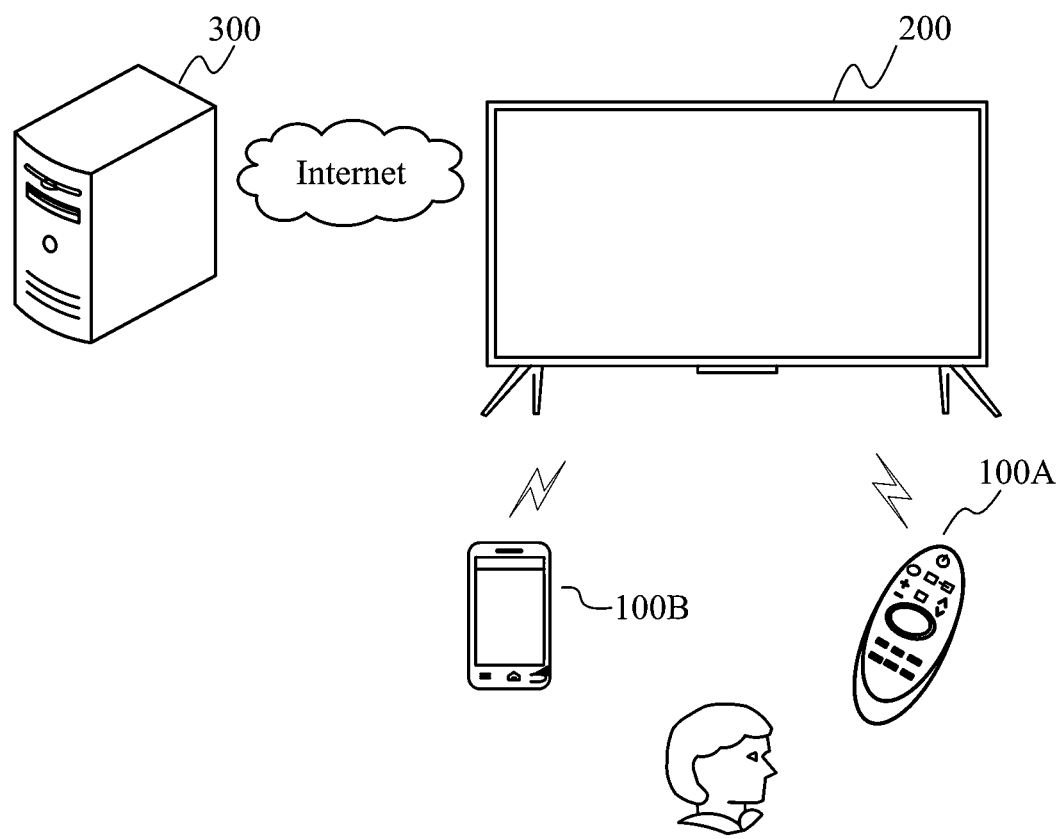
FIG. 1A illustrates a schematic diagram of an operation scenario between a display apparatus and a control device according to an embodiment of the present disclosure.

FIG. 1A illustrates a schematic diagram of an operation scenario between a display apparatus and a control device. As shown in the FIG. 1A, communication between the control device 100 and the display apparatus 200 may be performed in a wired or wireless manner.

Wherein, the control device 100 is configured to control the display apparatus 200, and can receive commands input from the user, translate the commands into instructions that can be recognized and responded by the display apparatus 200, and acts as an intermediary for interaction between the user and the display apparatus 200. For example, the display apparatus 200 responds to a channel up and channel down operation when the user operates a channel up and channel down key on the control device 100.

The control device 100 may be a remote controller 100A, including infrared protocol communication or Bluetooth protocol communication, and other short range communication manners, etc., to control the display apparatus 200 via wireless or other wired manners. A user may input user commands through keys, voice input, control panel input, and the like on a remote control to control the display apparatus 200. For example, a user may input a corresponding command through a volume up or a volume down key, a channel control key, an up/down/left/right direction key, a voice input key, a menu key, a power key, etc. on the remote control, so as to realize the function of controlling the display apparatus 200.

The control device 100 may also be a smart device, such as a mobile terminal 100B, a tablet, a computer, a laptop, or the like. For example, the display apparatus 200 is controlled by using an application running on a smart device. The application, through configuration, may provide a variety of controls for the user through an intuitive user interface (UI) on a screen associated with the smart device.

In some embodiments, the mobile terminal 100B may be installed with an application for connection communication with the display apparatus 200 via a network communication protocol for the purpose of one-to-one control operation and data communication. For example, the mobile terminal 100B may be made to establish a control instruction protocol with the display apparatus 200 to implement functions of physical keys arranged on the remote controller 100A by operating various function keys or virtual keys of a user interface provided on the mobile terminal 100B. It is also possible to transmit audio-video content displayed on the mobile terminal 100B to the display apparatus 200 to implement a synchronous display function.

The display apparatus 200 may provide a broadcast receiving function and a network television function that a computer supports. The display apparatus may be implemented as a digital television, a web television, an internet protocol television (IPTV), and the like.

The display apparatus 200 may be a liquid crystal display, an organic light emitting display, and a projection device. Specific display apparatus types, sizes, resolutions, and the like are not limited.

The display apparatus 200 is also in data communication with the server 300 through multiple communication manners. Here, the display apparatus 200 may be allowed to perform communication connection through a local area network (LAN), a wireless local area network (WLAN), and other networks. The server 300 may provide various content and interactions to the display apparatus 200. For example, display apparatus 200 may send and receive information such as receiving electronic program guide (EPG) data, receiving software program updates, or accessing a remotely stored digital media library. There may be a group, or multiple groups of servers 300, and may be one or more types of servers. Other web service content such as video-on-demand and advertising services is provided through the server 300.

Figure 1B:
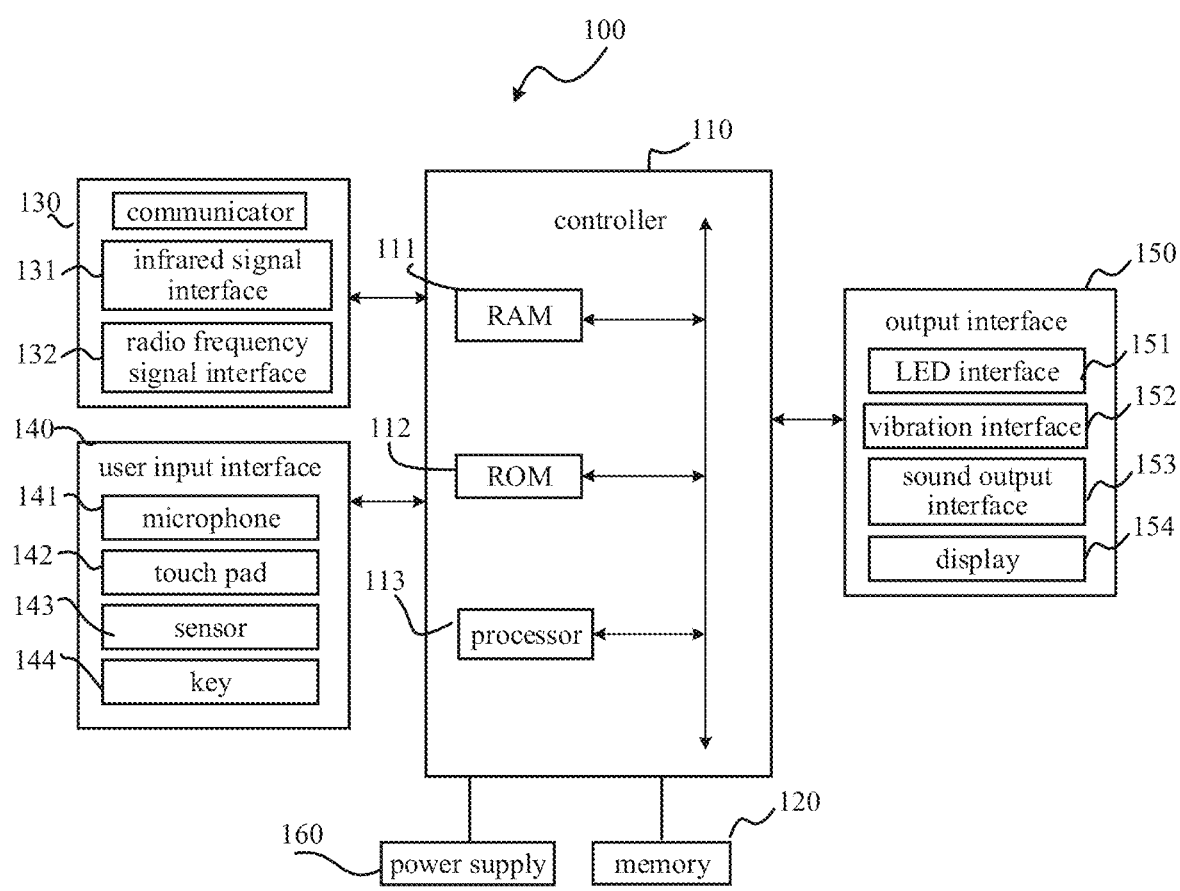
FIG. 1B illustrates a configuration block diagram of the control device 100 in FIG. 1A according to an embodiment of the present disclosure.

FIG. 1B illustrates a configuration block diagram of the control device 100 in FIG. 1A. As illustrated in FIG. 1B, the control device 100 includes a controller 110, a memory 120, a communicator 130, a user input interface 140, an output interface 150, and a power supply 160.

The controller 110 includes a random access memory (RAM) 111, a read only memory (ROM) 112, a processor 113, a communication interface, and a communication bus. The controller 110 is used to control the operation and operation of the control device 100, as well as communication cooperation between internal components, external and internal data processing functions.

In some embodiments, when an interaction like a user pressing a key arranged on the remote controller 100A or an interaction like touching a touch panel arranged on the remote controller 100A is detected, the controller 110 may control to generate a signal corresponding to the detected interaction and transmit the signal to the display apparatus 200.

A memory 120 is used for storing various running programs, data, and applications that drive and control the control device 100 in the control of the controller 110. The memory 120 may store various types of control signal instructions input from the user.

The communicator 130 realizes communication of control signals and data signals with the display apparatus 200 in the control of the controller 110. For example, the control device 100 transmits a control signal (e.g., a touch signal or a key signal) to the display apparatus 200 via the communicator 130, and the control device 100 may receive a signal transmitted from the display apparatus 200 via the communicator 130. The communicator 130 may include an infrared signal interface 131 and a radio frequency signal interface 132. For example, an infrared signal interface may be configured to convert a user input command in an infrared control signal in accordance with an infrared control protocol, which may be transmitted to the display apparatus 200 via an infrared transmission module. For another example, a radio frequency signal interface may be configured to convert a user input command in a digital signal and then modulate the digital signal by a radio frequency control signal modulation protocol, and finally transmit the signal to the display apparatus 200 by a radio frequency transmission interface.

The user input interface 140 may include at least one of a microphone 141, a touch pad 142, a sensor 143, a key 144, or the like, so that a user may input a user command for controlling the display apparatus 200 to the control device 100 by voice, touch, gesture, press, or the like.

The output interface 150 outputs a user command received via the user input interface 140 to the display apparatus 200 or outputs an image or a voice signal received by the display apparatus 200. Here, the output interface 150 may include an LED interface 151, a vibration interface 152 that generates vibration, a sound output interface 153 that outputs sound, a display 154 that outputs an image, and the like. For example, the remote controller 100A may receive an output signal such as audio, video, or data from the output interface 150 and display the output signal in an image form on the display 154, in an audio form at the sound output interface 153, or in a vibration form at the vibration interface 152.

The power supply 160 is used for providing power support for the components of the control device 100 in the control of the controller 110. The form may be a battery and an associated control circuit.

Figure 1C:
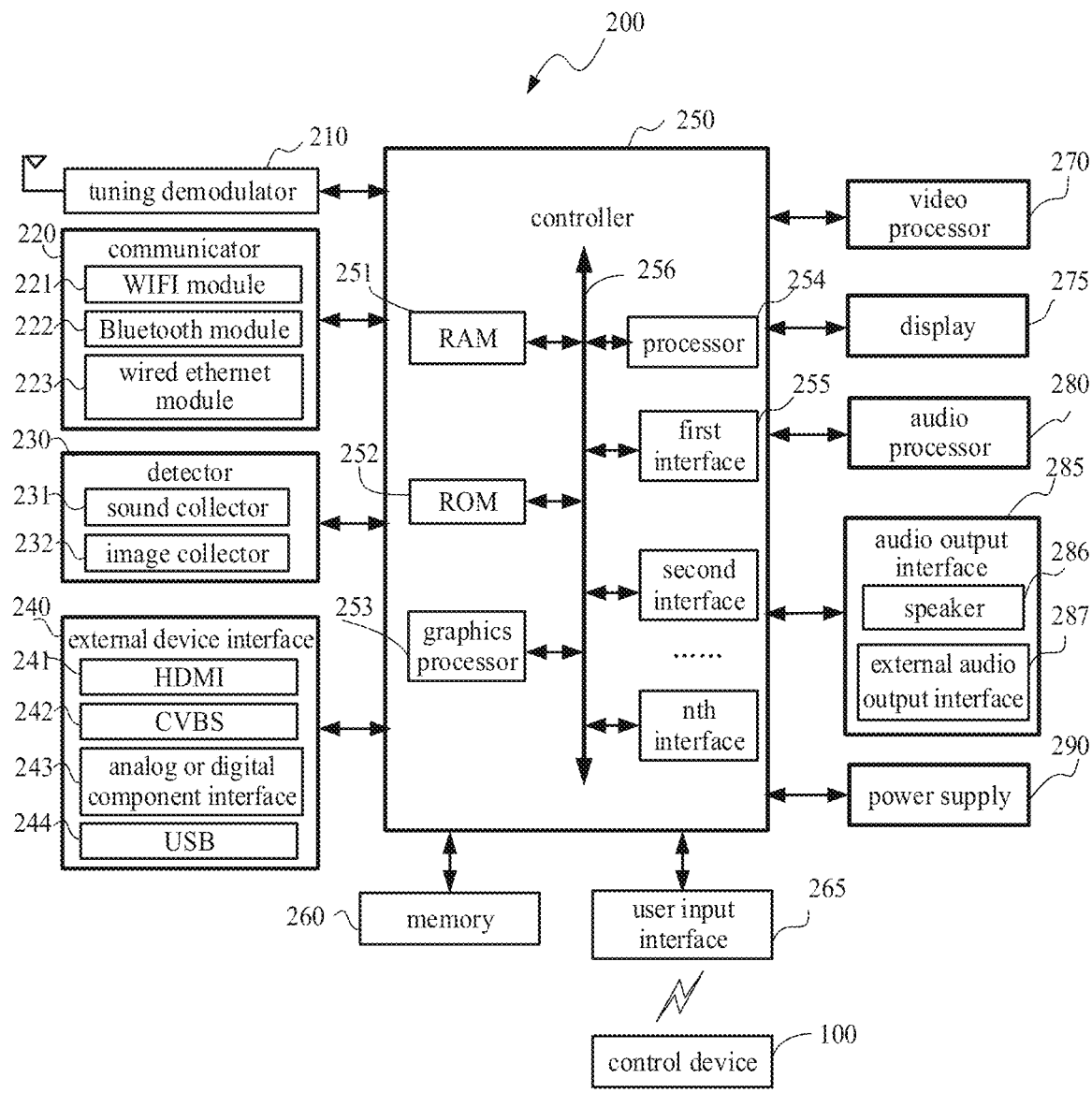
FIG. 1C illustrates a configuration block diagram of the display apparatus 200 in FIG. 1A according to an embodiment of the present disclosure.

FIG. 1C illustrates a configuration block diagram of the display apparatus 200. As shown in FIG. 1C, a tuning demodulator 210, a communicator 220, a detector 230, an external device interface 240, a controller 250, a memory 260, a user interface 265, a video processor 270, a display 275, an audio processor 280, an audio output interface 285, and a power supply 290 may be included in the display apparatus 200.

The tuning demodulator 210 is configured to receive broadcast television signals in a wired or wireless way, and may perform demodulation processing such as amplification, mixing, and resonance, for demodulating an audio-video signal carried in a frequency of a television channel selected by a user, and additional information (e.g., EPG data) from multiple wireless or wired broadcast television signals.

The tuning demodulator 210 responds to the frequency of the television channel selected by the user and the television signal carried by the frequency according to the user selection and under the control by the controller 250.

The tuning demodulator 210 can receive signals in a variety of ways depending on the broadcasting of television signals, such as terrestrial broadcasting, cable broadcasting, satellite broadcasting, internet broadcasting, or the like; and, depending on the modulation type, in either a digital modulation mode or an analog modulation mode; and the analog signal and the digital signal may be demodulated depending on the type of the television signal received.

In some other exemplary embodiments, the tuning demodulator 210 may also be in an external device, such as an external set-top box or the like. In this way, the set-top box outputs a television signal by modulation and demodulation and the signal is input in the display apparatus 200 through the external device interface 240.

The communicator 220 is a component for communicating with an external device or an external server according to various communication protocol types. For example, the display apparatus 200 may transmit content data to an external device connected via the communicator 220 or browse and download content data from an external device connected via the communicator 220. The communicator 220 may include a network communication protocol module such as a WIFI module 221, a Bluetooth communication protocol module 222, a wired ethernet communication protocol module 223, or a near field communication protocol module, so that the communicator 220 may receive a control signal of the control device 100 according to the control of the controller 250 and implement the control signal into a WIFI signal, a bluetooth signal, a radio frequency signal, or the like.

The detector 230 is a component of the display apparatus 200 to capture external environment or signals for interaction with the outside. The detector 230 may include a sound collector 231, such as a microphone, which may be configured to receive a user's voice, such as a voice signal of control instructions from a user to control the display apparatus 200; alternatively, the sound collector may capture ambient sound which is used for identifying the type of an ambient scene, thus enabling that the display apparatus 200 can adapt to ambient noise.

In some other embodiments, the detector 230 may also include an image collector 232, such as a camera, webcam, or the like, to capture an external environmental scene to change display parameters of the display apparatus 200 accordingly; and the detector 230 may also capture attributes of the user or interact with the user via gestures to enable interaction between the display apparatus and the user.

In some other embodiments, the detector 230 may also include a light receiver for capturing ambient light intensity to change display parameter of the display apparatus 200, and the like.

In some other embodiments, the detector 230 may also include a temperature sensor, such as by sensing ambient temperature, the display apparatus 200 may adjust the display color temperature of the image accordingly. In some implementations, the image color temperature of the display apparatus 200 may be adjusted into a cold tone in a high-temperature environment; and the image color temperature of the display apparatus 200 may be adjusted into a warm tone in a low-temperature environment.

The external device interface 240 is a component that provides the controller 250 to control data transfer between the display apparatus 200 and an external device. The external device interface 240 may be connected with an external device such as a set top box, a game device, a laptop computer, and the like in a wired/wireless manner, and may receive data such as a video signal (e.g., a moving image), an audio signal (e.g., music), additional information (e.g., EPG), and the like of the external device.

The external device interface 240 may include any one or more of a high-definition multimedia interface (HDMI) interface 241, a composite video blanking synchronization (CVBS) interface 242, an analog or digital component interface 243, a universal serial bus (USB) interface 244, a component interface (not shown), a red-green-blue (RGB) interface (not shown), and the like.

The controller 250 controls the operation of the display apparatus 200 and responds to a user by running various software control programs, such as an operating system and various applications, stored on the memory 260.

As shown in FIG. 1C, the controller 250 includes a random access memory (RAM) 251, a read only memory (ROM) 252, a graphics processor 253, a CPU processor 254, a communication interface 255, and a communication bus 256, wherein the RAM 251, the ROM 252, the graphics processor 253, the CPU processor 254, and the communication interface 255 are connected by the communication bus 256.

The ROM 252 is used for storing various system startup instructions. The power of the display apparatus 200 is started when a power signal is received, the CPU processor 254 runs the system start instructions in the ROM 252, copies the operating system stored in the memory 260 to the RAM 251 to start running the operating system. When the operating system startup is completed, the CPU processor 254 then copies the various applications in the memory 260 in the RAM 251, and then begins to start the various applications.

The graphics processor 253 is used for generating various graphical objects, such as icons, operating menus, and user input command display graphics, and the like. The graphics processor 253 may include an operator for operating by receiving various interaction instructions input from a user to thereby display various objects according to display properties; and the graphics processor 253 may also include a renderer for generating various objects obtained based on the operator, and displaying the result of rendering on the display 275.

The CPU processor 254 is used for executing operating system and application instructions stored in the memory 260 and performing processing of various applications, data, and content in accordance with user input commands in order to ultimately display and play various audio-video content.

In some exemplary embodiments, the CPU processor 254 may include multiple processors. The multiple processors may include one main processor and multiple or one sub-processor. The main processor is configured to perform some initialization operations of the display apparatus 200 in the display apparatus preloading mode, and/or to display the screen in the normal mode. The multiple processors or one sub-processor is used for performing one operation in a display apparatus standby mode or the like.

The communication interface 255 may include a first interface to an nth interface. These interfaces may be network interfaces that are connected to external devices via a network.

The controller 250 may control the overall operation of the display apparatus 200. For example, in response to receiving a user input command for selecting a GUI object displayed on the display 275, the controller 250 may perform an operation related to the object selected by the user input command.

The object may be any one of the selectable objects, such as a hyperlink or icon. The operation related to the selected object, such as an operation for displaying a connection to a hyperlink page, a document, an image, or the like, or an operation for launching an application corresponding to the object. The user input command for selecting the GUI object may be an input command through various input devices (e.g., a mouse, a keyboard, a touchpad, etc.) connected to the display apparatus 200 or a voice command corresponding to a voice spoken by the user.

The memory 260 is used for storing various types of data, software programs, or applications that drive and control operation of the display apparatus 200. The memory 260 may include volatile and/or nonvolatile memory. While the term "memory" includes the memory 260, the ROM 251 and the ROM 252 of the controller 250, or a memory card in the display apparatus 200.

In some embodiments, the memory 260 is specifically configured to store running programs that drive the controller 250 in the display apparatus 200, various applications built in the display apparatus 200 and downloaded by a user from an external device, and data such as visual effect images for configuring various GUIs provided by the display 275, various objects related to the GUIs, and selectors for selecting GUI objects.

In some embodiments, the memory 260 specifically serves to store drivers and related data of the tuning demodulator 210, the communicator 220, the detector 230, the external device interface 240, the video processor 270, the display 275, the audio processor 280, etc. or example, external data received from an external device interface (e.g., audio-video data) or user data received from a user interface (e.g., key press information, voice information, touch information, etc.).

In some embodiments, the memory 260 specifically stores software and/or programs representing an operating system (OS) that may include, for example, a kernel, middleware, an application programming interface (API), and/or applications. In some embodiments, a kernel may control or manage system resources, as well as functions implemented by other applications, such as the middleware, the API, or the applications; meanwhile, the kernel may provide an interface to allow the middleware, the API, or the applications to access the controller to enable control or management of system resources.

Figure 1D:
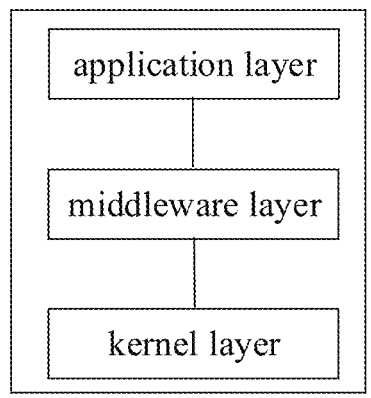
FIG. 1D illustrates an architectural configuration block diagram of an operating system in a memory of the display apparatus 200 according to an embodiment of the present disclosure.

FIG. 1D illustrates an architectural configuration block diagram of an operating system in a memory of the display apparatus 200. The operating system architecture includes, in order from top to bottom, an application layer, a middleware layer, and a kernel layer.

The middleware layer may provide some standardized interfaces to support the operation of various environments and systems. For example, the middleware layer may be implemented as the multimedia and hypermedia information coding expert group (MHEG) for middleware related to data broadcasting, the DLNA middleware for middleware related to communication with external devices, the middleware for providing a browser environment where various applications run within a display apparatus, and so on.

The kernel layer provides core system services such as file management, memory management, process management, network management, system security rights management, and the like. The kernel layer may be implemented as kernels based on various operating systems, e.g., kernels based on the Linux operating system.

The kernel layer also simultaneously provides communication between system software and hardware, device driver services are provided for various hardware, such as display drivers for panels, camera drivers for cameras, key drivers for remote controls, WiFi drivers for WiFi modules, audio drivers for audio output interfaces, power management drivers for power management (PM) modules, and the like.

The user interface 265 receives various user interactions. Specifically, via the interface, an input signal from the user is transmitted to the controller 250, or an output signal from the controller 250 is transmitted to the user. In some embodiments, the remote controller 100A can transmit user input signals such as power signals, channel selection signals, volume adjustment signals, etc., to the user interface 265, and then the user interface 265 transmits the input signals to the controller 250; alternatively, the remote controller 100A may receive an output signal such as audio, video, or data output from the user interface 265 processed by the controller 250, and display the output signal or output the output signal in an audio or vibration form.

In some embodiments, the user may input user commands on a graphical user interface (GUI) presented on the display 275, and the user interface 265 receives the user input commands via the GUI. In particular, the user interface 265 may receive user input commands for controlling the position of a selector in the GUI to select different objects or items.

Alternatively, the user may input a user command by inputting a certain voice or gesture, and the user interface 265 receives the user input command by recognizing the voice or gesture through a sensor.

The video processor 270 is used for receiving an external video signal and performing video data processing according to a standard codec protocol of an input signal to obtain a video signal that is directly displayed or played on the display 275.

The display 275 is used for receiving image signals from the video processor 270 for displaying video content, images, and menu manipulation interfaces. The display video content may be from video content in a broadcast signal received by the tuning demodulator 210 or may be from video content input by the communicator 220 or the external device interface 240. The display 275 concurrently displays a user interface UI generated in and configured to control the display apparatus 200.

The display 275 may include a screen component for presenting screens and a drive component for driving display of images. Alternatively, if the display 275 is a projection display, a projection device and a projection screen may also be included.

The audio processor 280 is configured to receive an external audio signal, perform data processing according to a standard codec protocol of an input signal, so as to obtain an audio signal that can be played in the speaker 286.

In some implementations, the audio processor 280 may support various audio formats, such as MPEG-2, MPEG-4, advanced audio coding (AAC), high efficiency AAC (HE-AAC), and the like.

The audio output interface 285 is used for receiving an audio signal output from the audio processor 280 in the control of the controller 250, and the audio output interface 285 may include a speaker 286, or an external audio output interface 287 output to a sound device of an external device, such as a headphone output interface.

In some other embodiments, the video processor 270 may include one or more chips. The audio processor 280 may also include one or more chips.

In some other embodiments, the video processor 270 and the audio processor 280 may be separate chips or integrated with the controller 250 in one or more chips.

The power supply 290 is used for providing power supply support for the display apparatus 200 by power input from an external power source in the control of the controller 250.

The power supply 290 may be a built-in power circuit inside the display apparatus 200 or may be a power supply outside the display apparatus 200.

It is noted that the term "source" in this embodiment may be an input source corresponding to an external device, such as an input source provided by an external device connected by a physical interface such as HDMI1, HDMI2, HDMI3, HDMI4, TV, AV, VGA; it can also be an input source provided by a browsing server and corresponding to applications downloaded from the server, such as an input source provided by virtual channels such as Youtube, Netflix, etc.; it can also be a picture mode, e.g. standard, clear, energy saving, movie, movement, game, etc. mode; it may also be the type of signal to which the input content corresponds, such as SDR, HDR, HDR10, HDR10+, HLG, Dolby vision, etc.

Based on the different descriptions above, a display apparatus may include a large number of sources. As an embodiment, the number of sources that a display apparatus includes may be represented as NSource×NPicMode×NSignal, wherein Source represents channels and NSource represents the number of channels; PicMode denotes an picture mode, NPicMode denotes a number of picture modes; Signal represents the signal type and NSignal represents the number of signal types. For example, a display apparatus includes 15 channels, 7 picture modes, and 2 signal types, then the number of sources that the display apparatus includes is 15×7×2=210.

It is noted that an item refers to a visual object displayed in a GUI provided by a display apparatus to represent corresponding content such as an icon, a thumbnail, a link, and the like. The item is often displayed in a variety of forms. For example, the item may include textual content and/or images for displaying thumbnails related to textual content. As another example, the item may be text and/or an icon of an application.

It is also noted that the display of the selector may be in the form of a focus object. The movement of a focus object in a display apparatus may be controlled to select or control an item according to a user's input through a control device. For example, a user may select and control an item by controlling movement of a focus object between items by controlling directional keys on the device. The identification form of the focus object is not limited. The position of the focus object may be achieved or identified by setting the item background color, or may be identified by changing the border line, size, transparency and outline and/or font, etc. of the text or image of the focus item.

FIGS. 2A-2I illustrate schematic diagrams of a GUI provided by the display apparatus 200 by operating the control device 100.

Figure 2A:
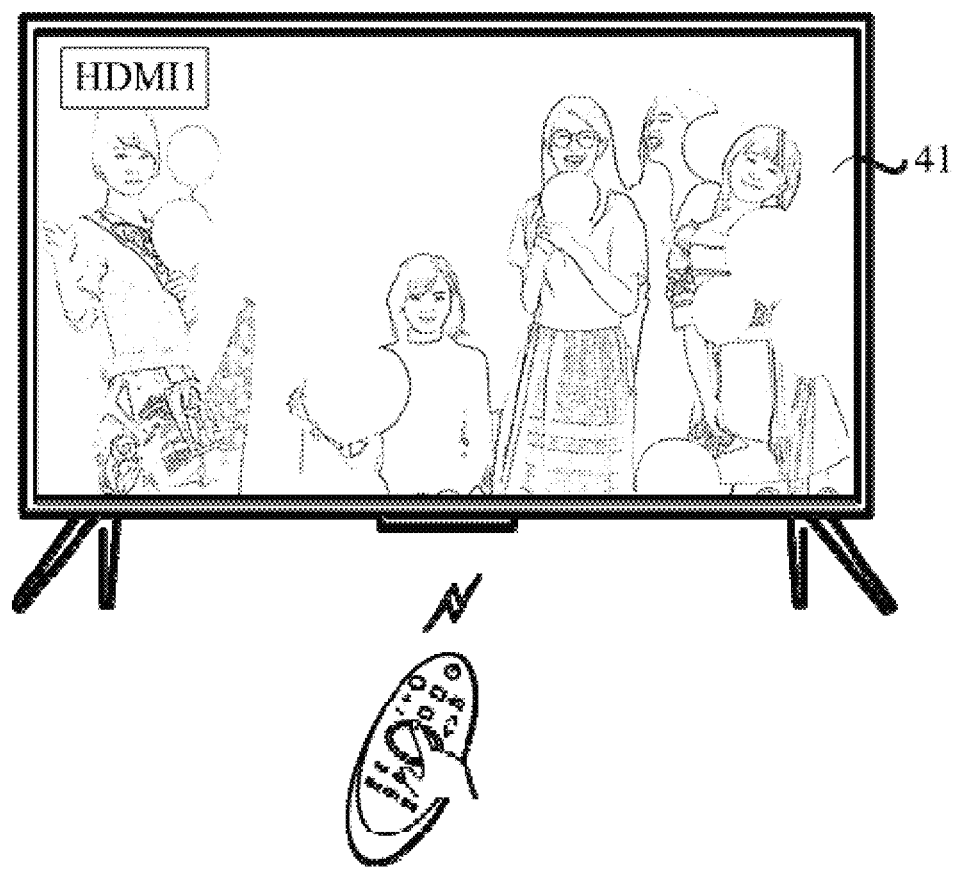
FIGS. 2A-2I illustrate schematic diagrams of a GUI provided by the display apparatus 200 by operating the control device 100 according to an embodiment of the present disclosure.

As shown in FIG. 2A, the display apparatus may provide a play screen 41 input via the HDMI1 for the display, and the play screen may include at least one of an image, text, video content, to the display. For example, the playback screen shown in FIG. 2a is a picture screen.

In FIG. 2A, when a user wants to adjust the picture quality of a playback screen presented on a display of a display apparatus, an adjustment instruction may be input by operating a control device, and the display apparatus may display menu content that needs to be superimposed on a current playback screen in response to a user's input.

Figure 2B:
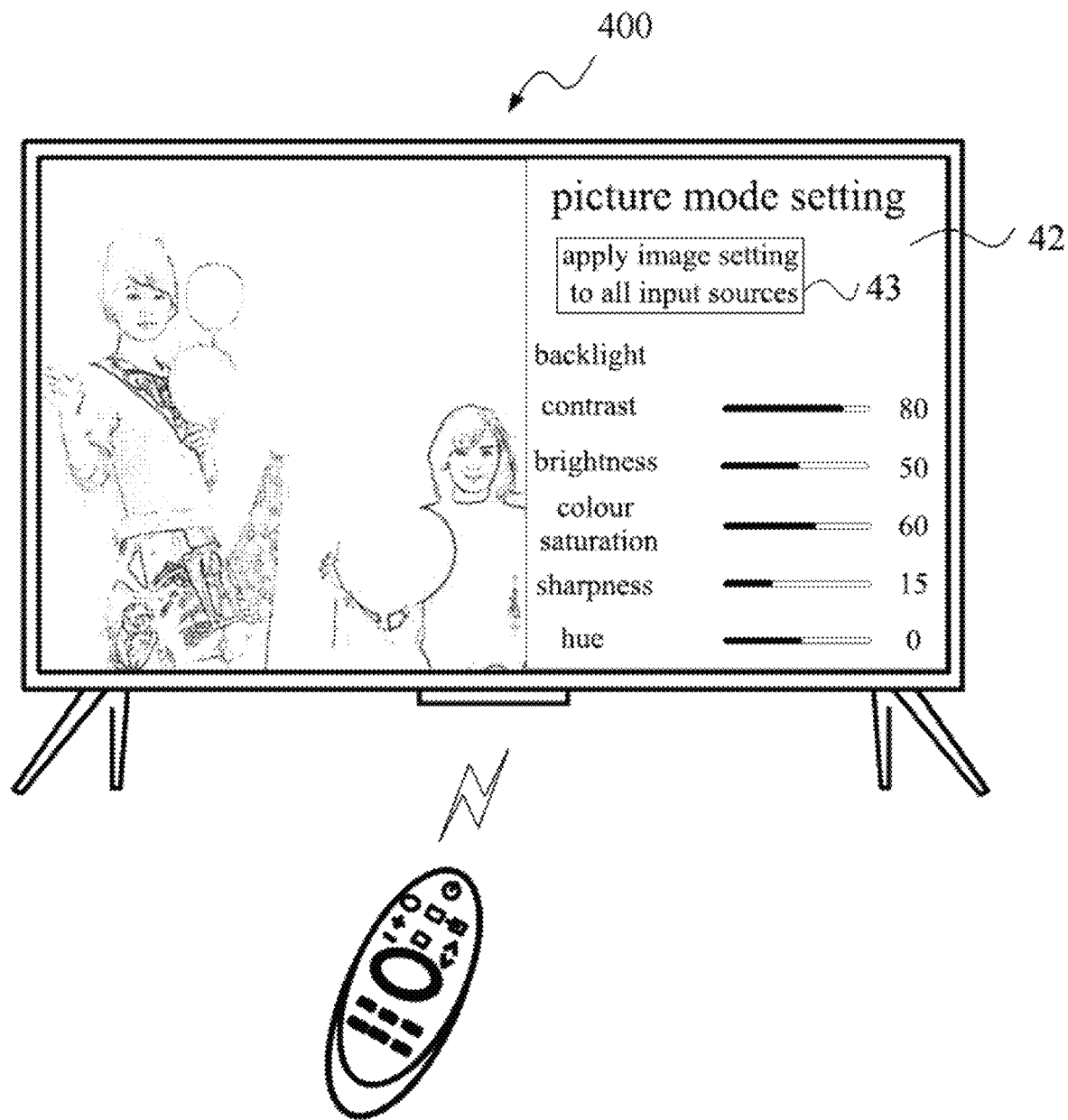

For example, as shown in FIG. 2A, the user, by pressing a designated key on the control device, such as a setting key, causes the display apparatus to provide the display with a GUI as shown in FIG. 2B in response to the key input, the GUI including menu content 42 and a selector 43 for indicating that a menu item in the menu content is selected, wherein the position of the selector within the menu content is moveable by an input of the user operating control device to change selection of different menu items.

In FIG. 2B, the user operates the control device to instruct the selector 43 to select an item "apply image setting to all input sources", e.g. pressing an up key on the control device, the user then operates the control device to confirm the item "apply image setting to all input sources" selected by the selector, for example, pressing an OK key on the control device, the display apparatus, in response to this user input, synchronously writes and stores menu content data corresponding to each menu item in the menu content 42 to other sources except the current source, for example the menu items: contrast value 80, brightness value 50, colour saturation value 50, sharpness value 15, hue value 0; while still keeping the selector staying on the item "apply image setting to all input sources".

Figure 2C:
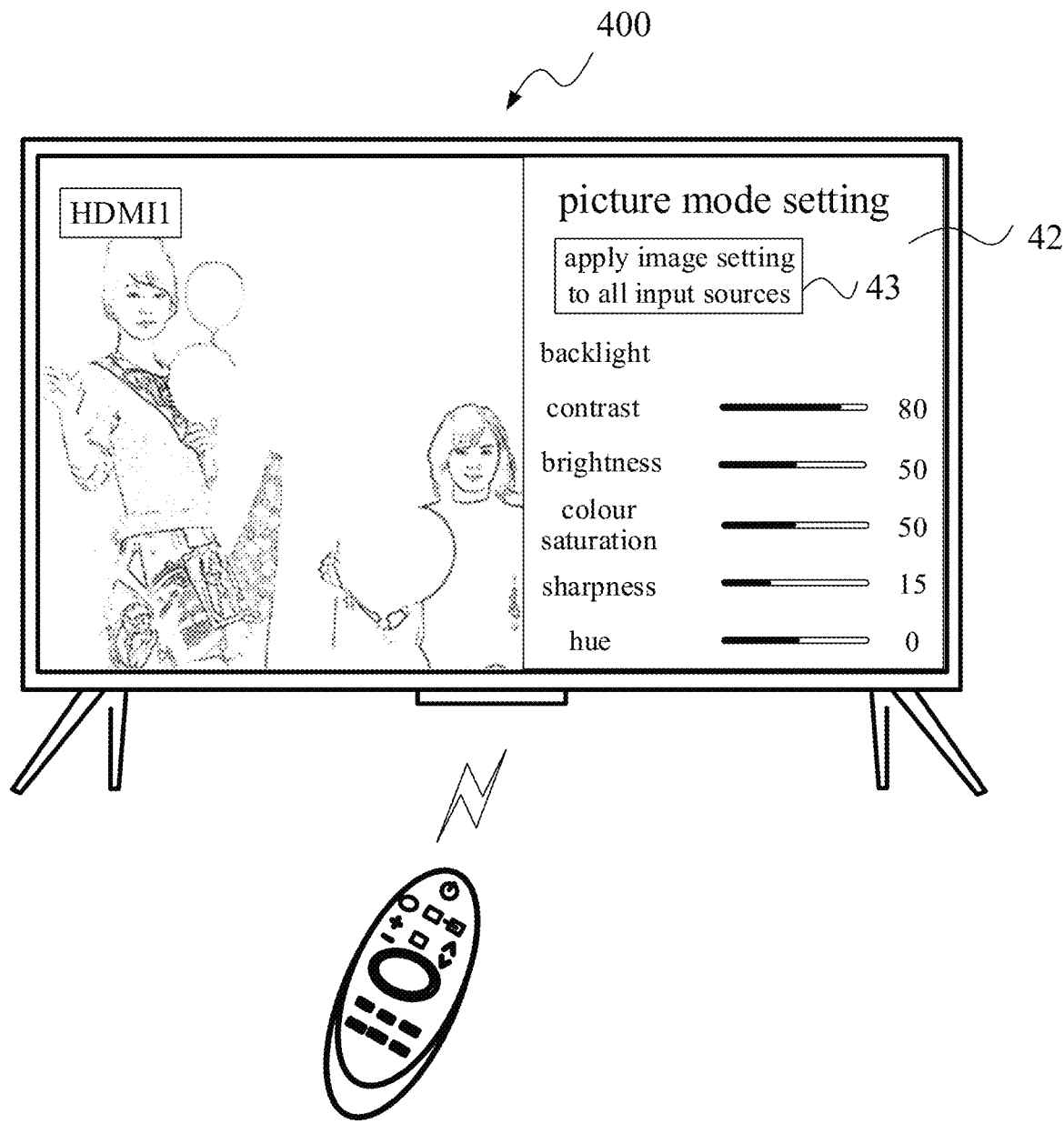

In some embodiments, in a case where the item "apply image setting to all input sources" is activated, the user again operates the control device to instruct the selector to select a colour saturation item, the display apparatus modifies the numerical value of the colour saturation item, e.g. from 60 shown in FIG. 2B to 50 shown in FIG. 2C, in response to a user input for adjusting the numerical value of the colour saturation item, and stores the numerical value 50 of the colour saturation item in the current source; at the same time, the value 50 of the color saturation item is synchronously written and stored in other sources except the current source.

Figure 2D:
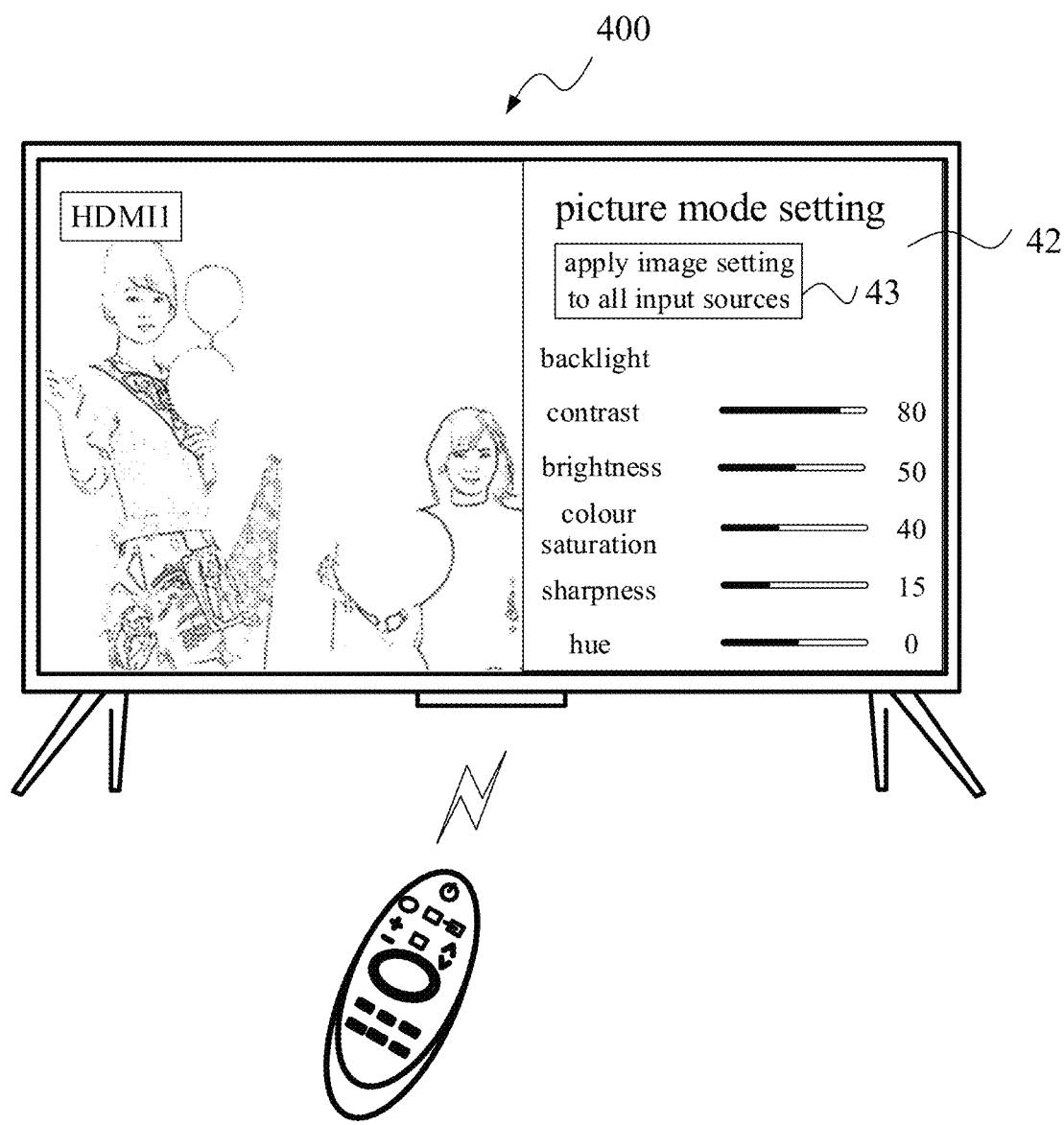

In still further embodiments, with the item "apply image setting to all input sources" activated, the display apparatus continues to modify the value of the color saturation item, e.g., from 50 as shown in FIG. 2C to 40 as shown in FIG. 2D, in response to a user input for adjusting the value of the color saturation item, and stores the value of 40 for the color saturation item in the current source; at the same time, the value 40 for the color saturation item is synchronously written and stored in other sources except the current source.

Figure 2E:
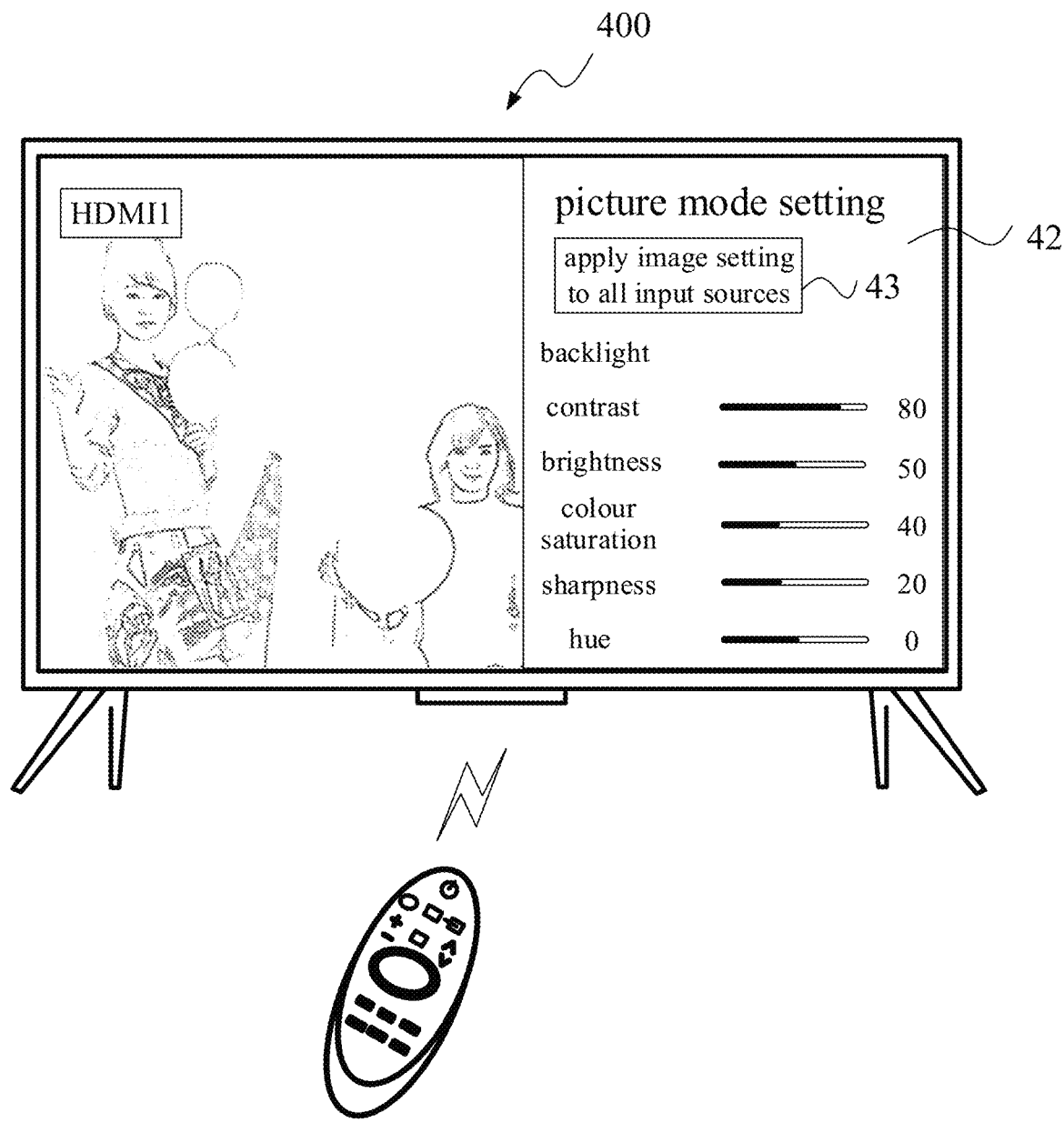

In still further embodiments, in a case where the item "apply image setting to all input sources" is activated, the user again operates the control device to instruct the selector to select a sharpness item, the display apparatus, in response to a user input for adjusting the value of the sharpness item, modifies the value of the sharpness item, e.g., from 15 shown in FIG. 2D to 20 shown in FIG. 2E, and stores the value of 20 of the sharpness item in the current source; at the same time, the value 20 of this sharpness item is synchronously written and stored in other sources except the current source.

Figure 2F:
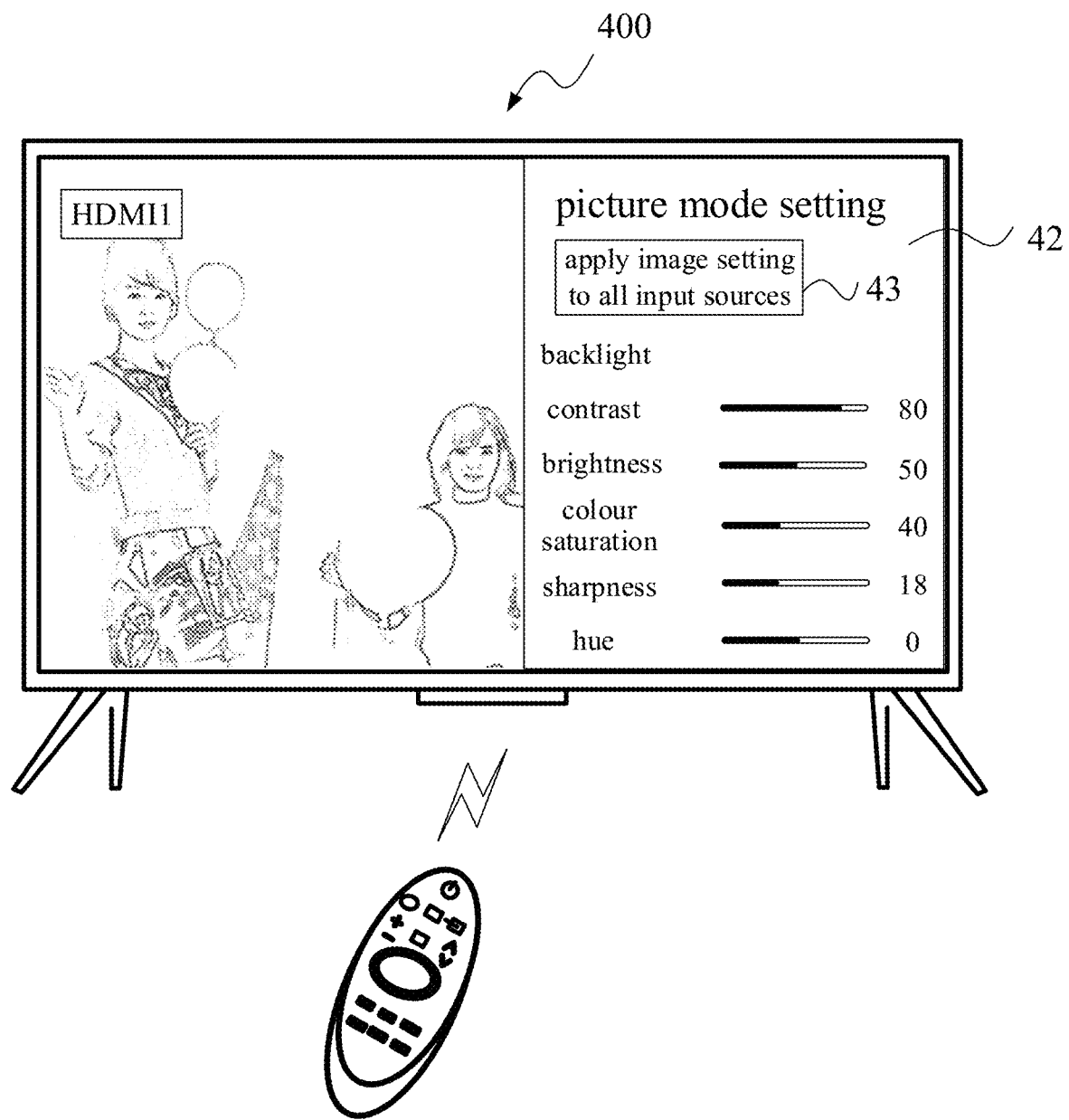

In still further embodiments, in a case where the item "apply image setting to all input sources" is activated, the display apparatus continues to modify the value of the sharpness item, e.g., from 20 as shown in FIG. 2E to 18 as shown in FIG. 2F, in response to a user input for adjusting the value of the sharpness item, and stores the value 18 of the sharpness item in the current source; at the same time, the value 18 of this sharpness item is synchronously written and stored in other sources except the current source.

The user then continues to play the screen shown in FIG. 2A by pressing a designated key on the control device, such as a back or exit key, causing the display apparatus to close the menu content 42 in response to the key input.

Figure 2G:
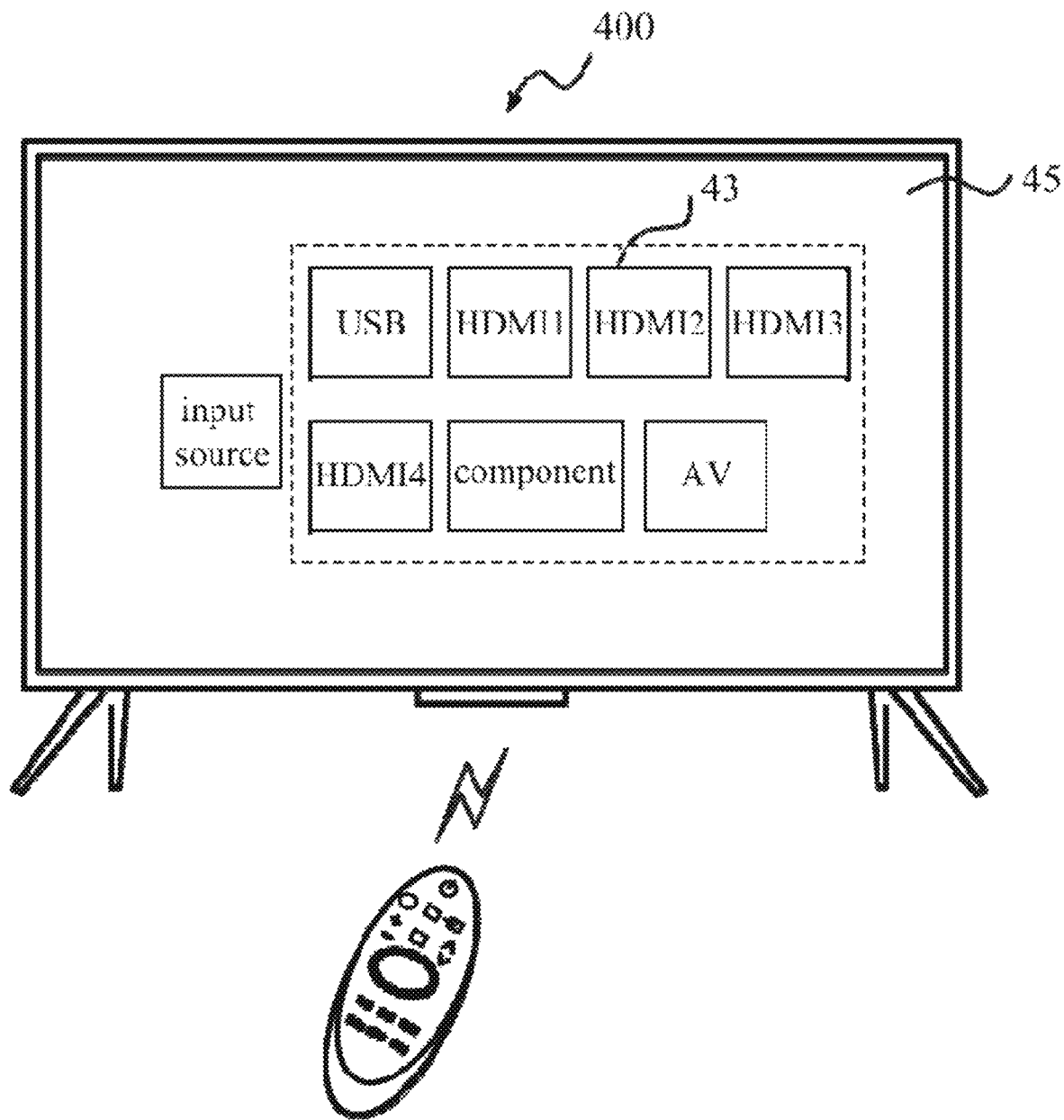
Figure 2H:
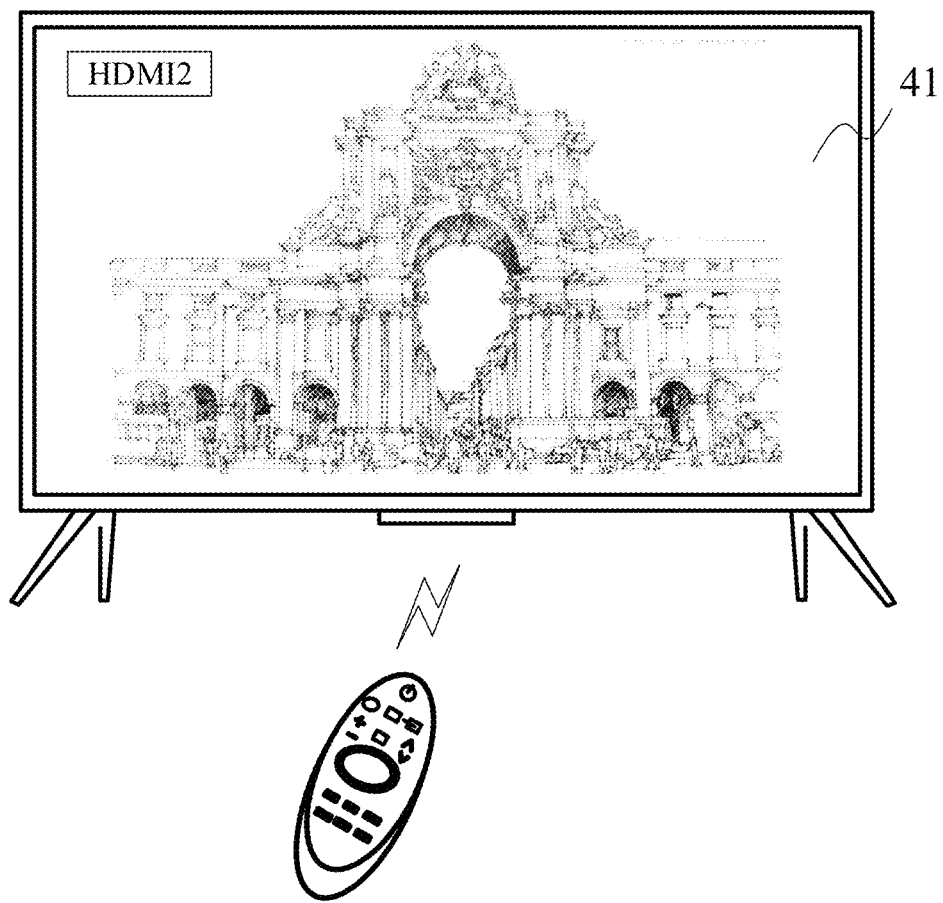

In some embodiments, as shown in FIG. 2A, a user presses a designated key on the control device, such as an input source key, causing the display apparatus to provide a GUI for the display in response to the key input, as shown in FIG. 2G. The GUI is an input source list interface 45 provided by the display apparatus. The input source list interface 45 includes an input interface providing multiple external device connections, such as HDMI, USB, AV, etc., for a user to access the content of services provided by the external device. For example, the user operates the control device to instruct the selector 43 to select the item HDMI2, and activates the item HDMI2, then the display apparatus switches the input source to HDMI2 in response to the user input, and at the same time displays the content of the service provided by the HDMI2 input source, such as the play screen 41 shown in FIG. 2H.

Figure 2I:
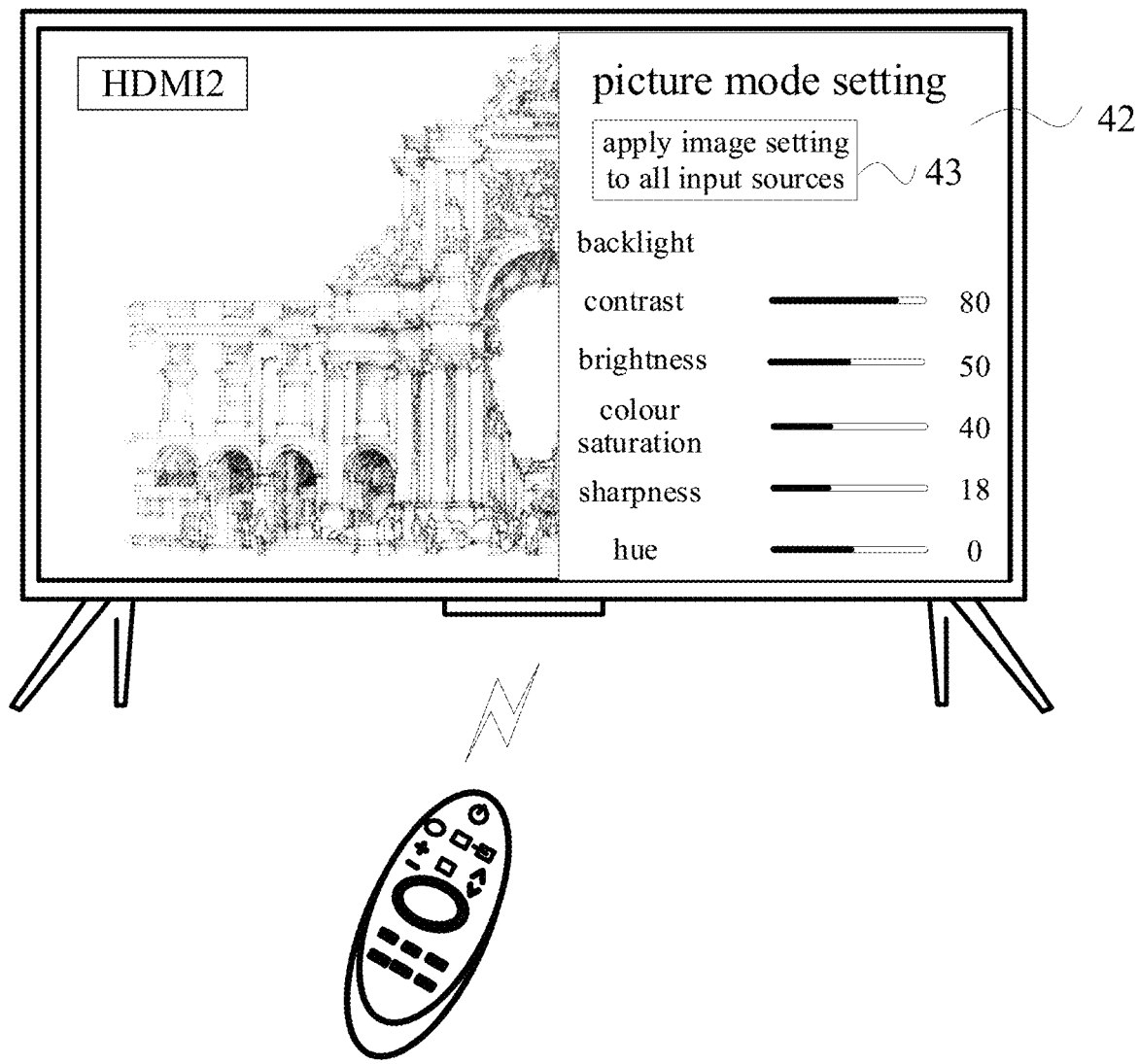

In some embodiments, the user presses a designated key on the control device, such as a setting key, causing the display apparatus to provide a GUI for the display in response to the key input. Here, the GUI may include menu content as shown in FIG. 2I, wherein the values of each menu item in FIG. 2I are the same as the values of each menu item in FIG. 2F, i.e. the parameters related to the picture mode setting in the HDMI2 input source are identical to the last modifications and setting in the HDMI1 input source.

FIGS. 3A-3J illustrate schematic diagrams of a GUI provided by the display apparatus 200 by operating the control device 100.

Figure 3A:
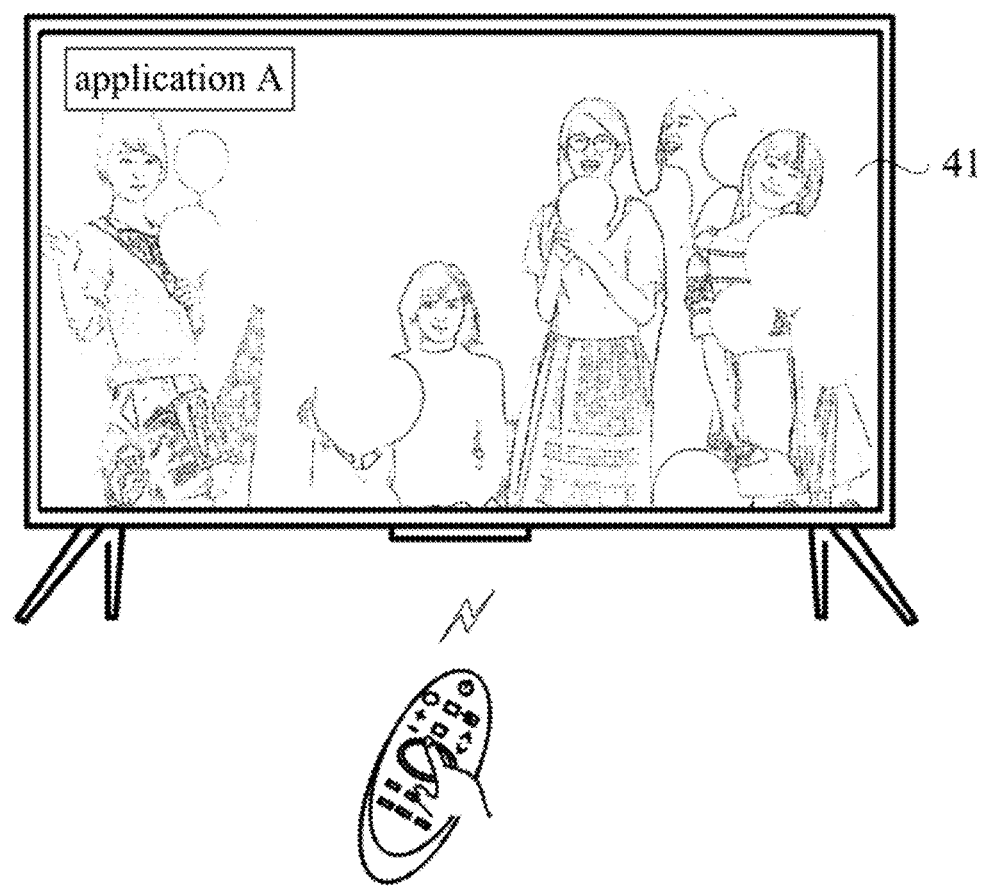
FIGS. 3A-3J illustrate schematic diagrams of a GUI provided by the display apparatus 200 by operating the control device 100 according to an embodiment of the present disclosure.

As illustrated in FIG. 3A, the display apparatus may provide a play screen 41 input by the application A, which may be at least one of an image, a text, and a video content, for the display. For example, the playback screen shown in FIG. 3A is an image screen.

In FIG. 3A, when a user wants to adjust the image quality of a playback screen presented on a display of the display apparatus, an adjustment instruction may be input by operating a control device, and the display apparatus may display menu content to be superimposed on a currently playback screen in response to the user's input. For example, as shown in FIG. 3A, the user, by pressing a designated key on the control device, such as a setting key, causes the display apparatus to provide the display with a GUI as shown in FIG. 3B in response to the key input, the GUI including menu content 42 and a selector 43 for indicating that a menu item in the menu content is selected.

Figure 3B:
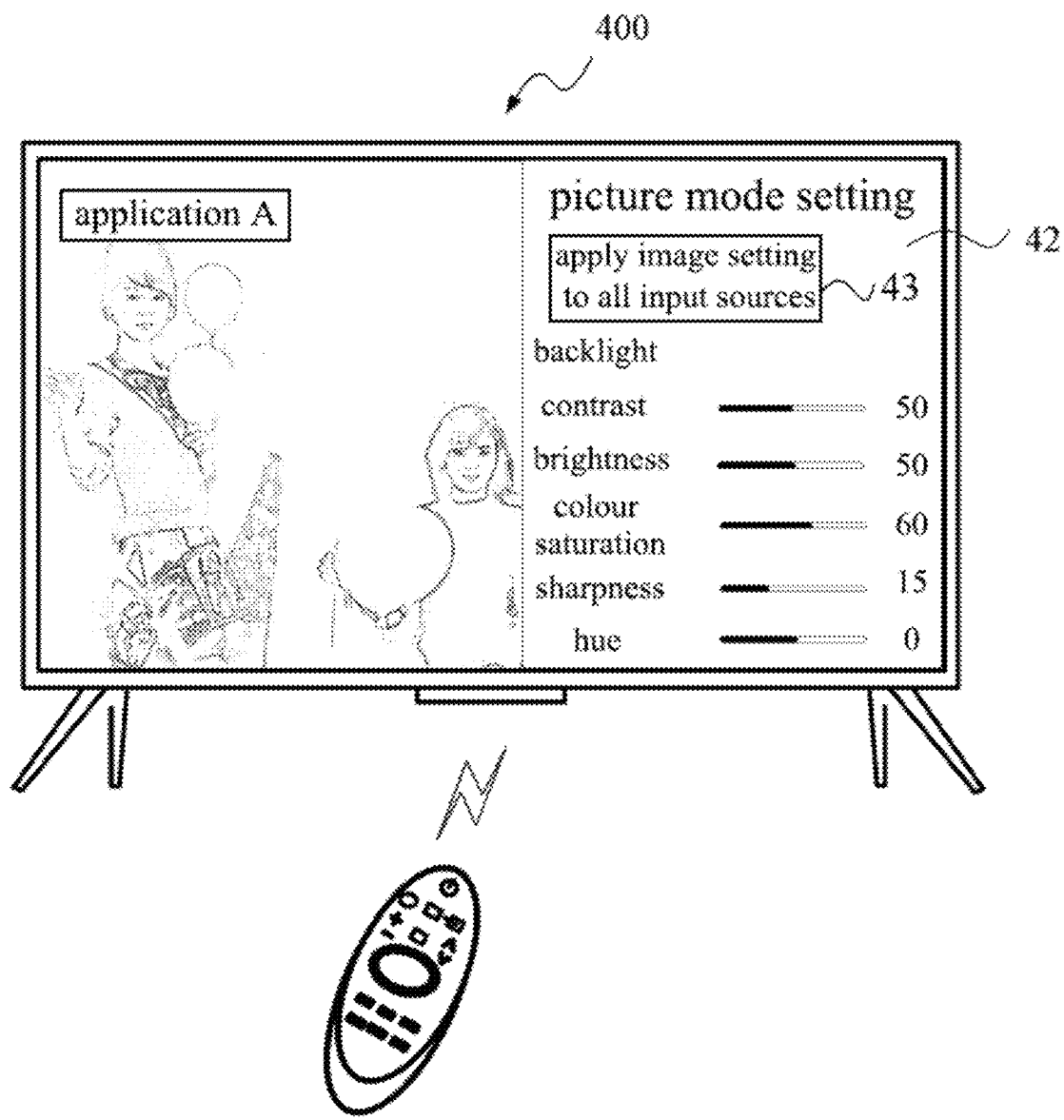
Figure 3C:
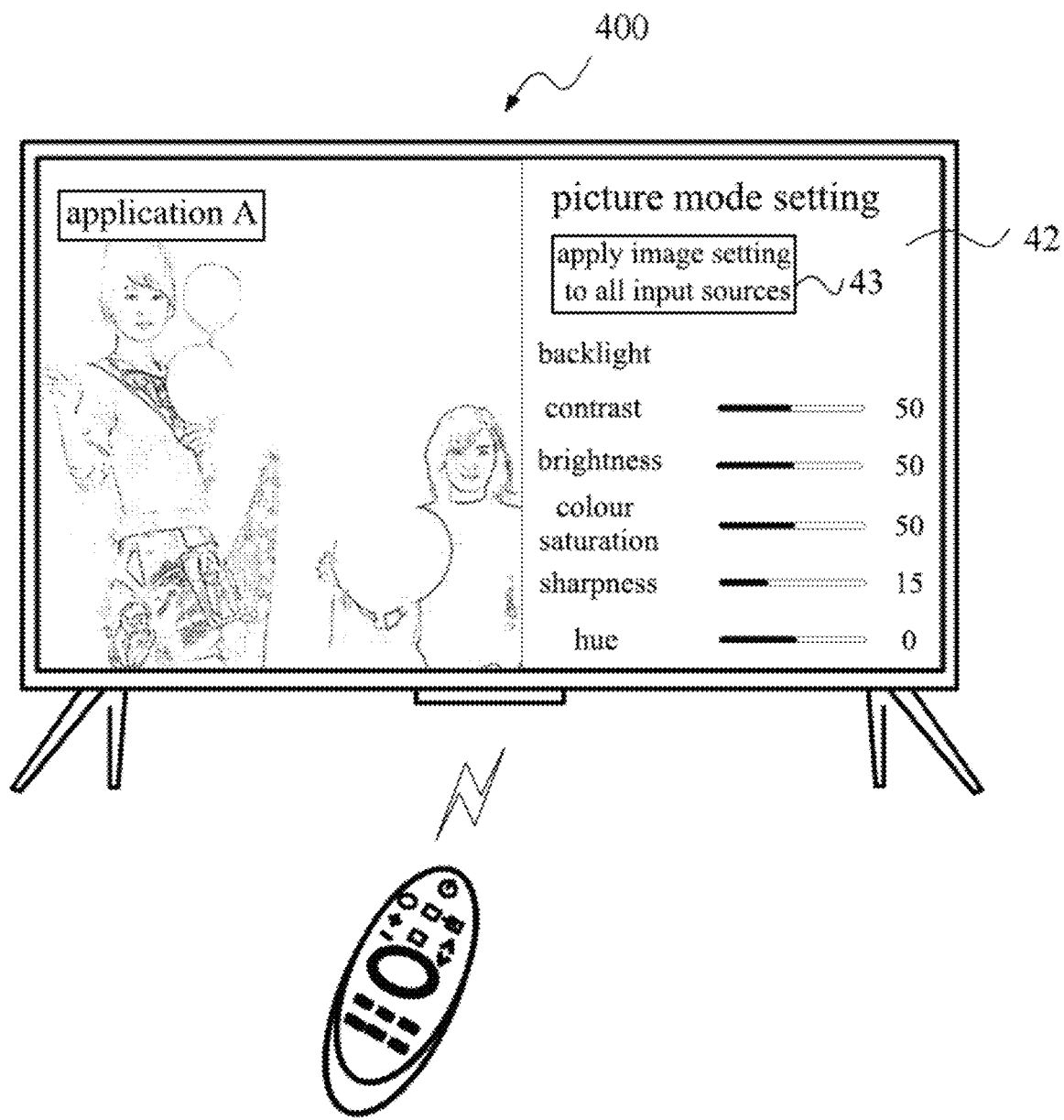

In FIG. 3B, the user operates the control device to instruct the selector to select a colour saturation item, the display apparatus modifies the value of the colour saturation item, e.g. from 60 shown in FIG. 3B to 50 shown in FIG. 3C, in response to a user input for adjusting the value of the colour saturation item, and stores the value 50 of the colour saturation item in the current source.

Figure 3D:
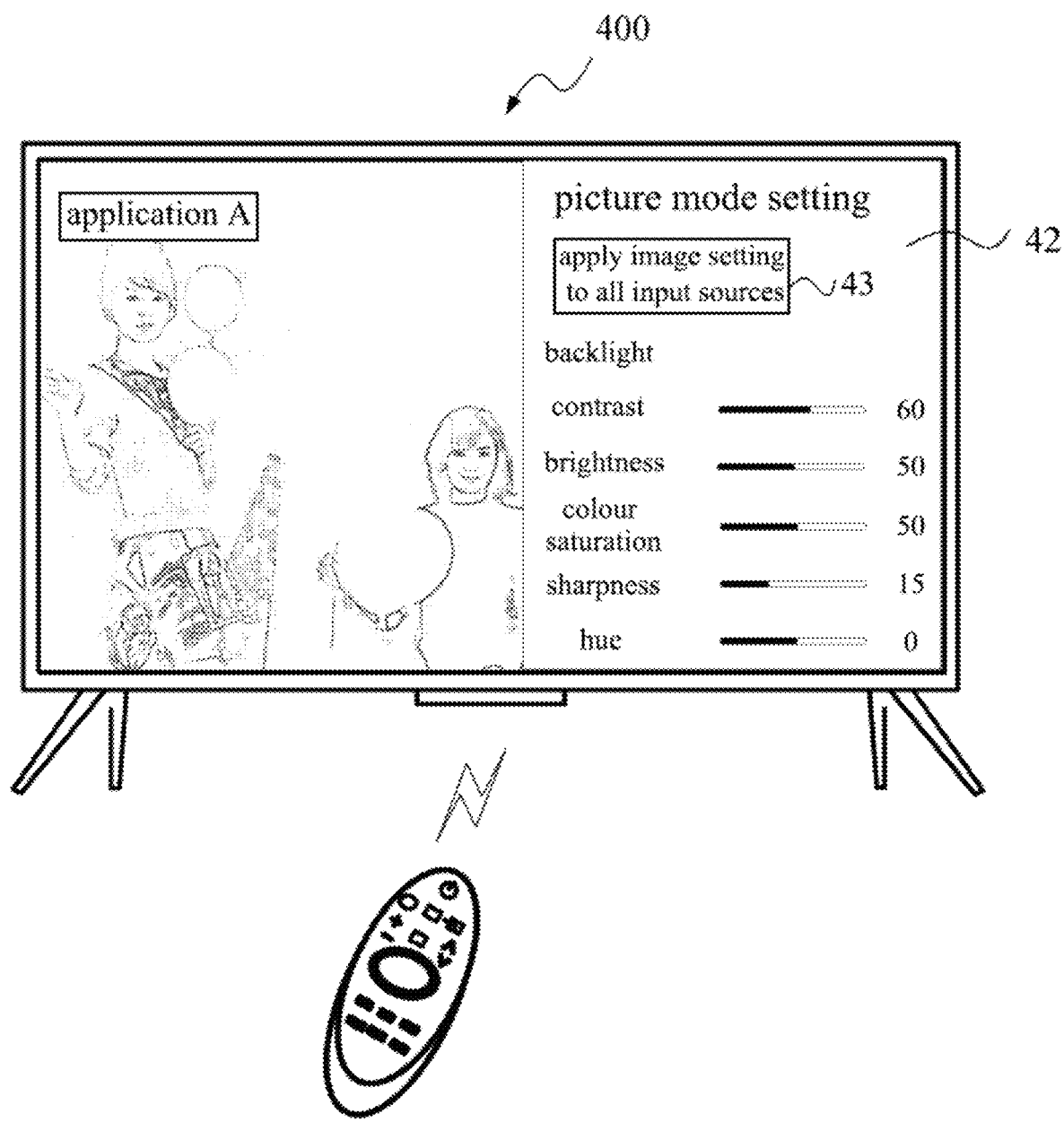

In FIG. 3C, the user operates the control device to instruct the selector to select a contrast item, the display apparatus modifies the value of the contrast item, e.g., from 50 shown in FIG. 3C to 60 shown in FIG. 3D, in response to a user input for adjusting the value of the contrast item, and stores the value 60 of the contrast item in the current source.

Figure 3E:
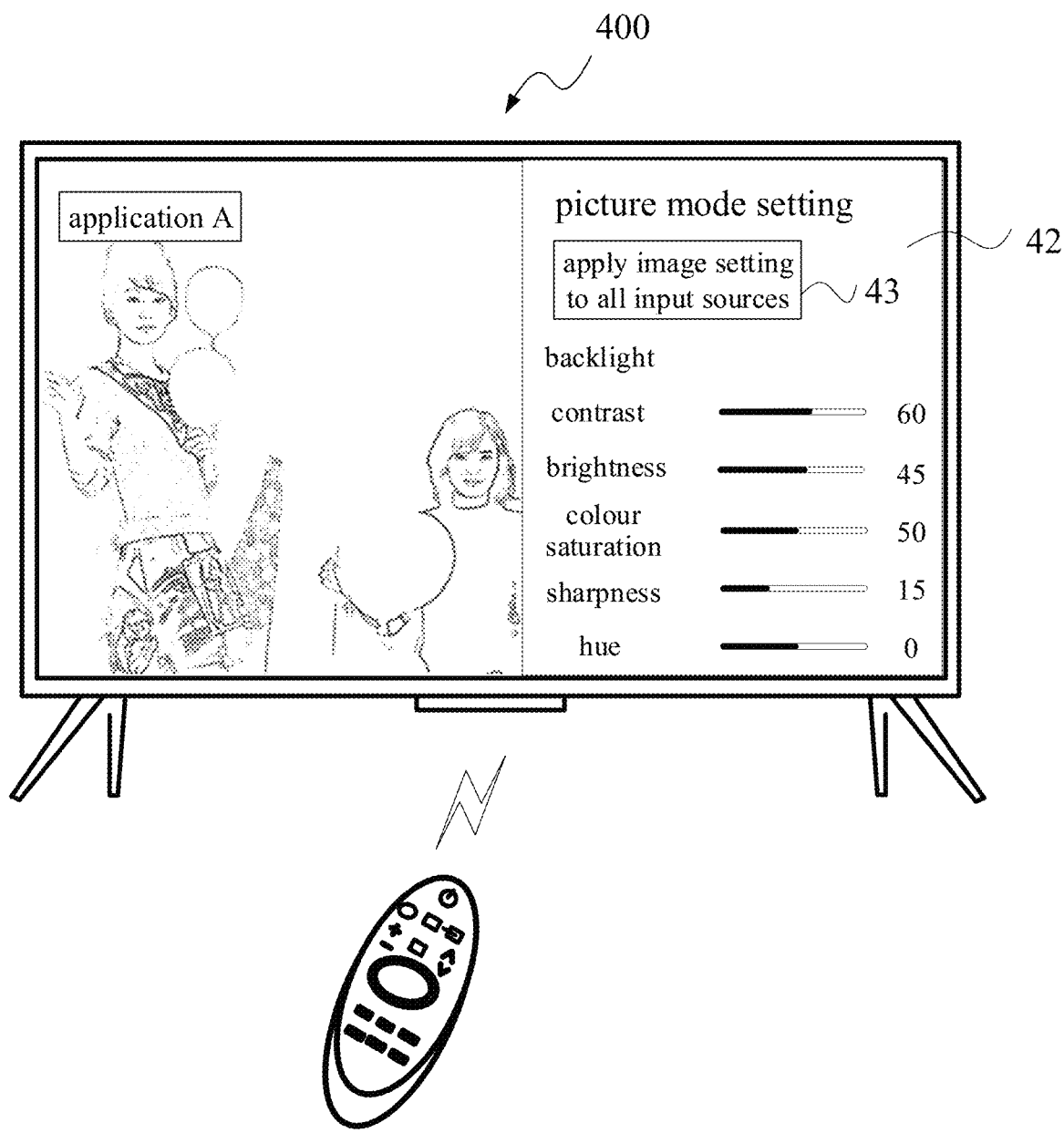

In FIG. 3D, the user operates the control device to instruct the selector to select a brightness item, the display apparatus modifies the value of the brightness item, e.g., from 50 shown in FIG. 3D to 45 shown in FIG. 3E, in response to a user input for adjusting the value of the brightness item, and stores the value of the brightness item 45 in the current source.

In FIG. 3E, the user operates the control device to instruct the selector 43 to select the item "apply image setting to all input sources", e.g. pressing an up key on the control device, the user then operates the control device to confirm the item "apply image setting to all input sources" selected by the selector, for example, pressing an OK key on the control device, the display apparatus, in response to this user input, synchronously writes and stores menu content data corresponding to each menu item in the menu content 42 to other sources except the current source, for example the menu items are: contrast value 60, brightness value 45, colour saturation value 50, sharpness value 15, hue value 0; while still keeping the selector staying on the item "apply image setting to all input sources".

Figure 3F:
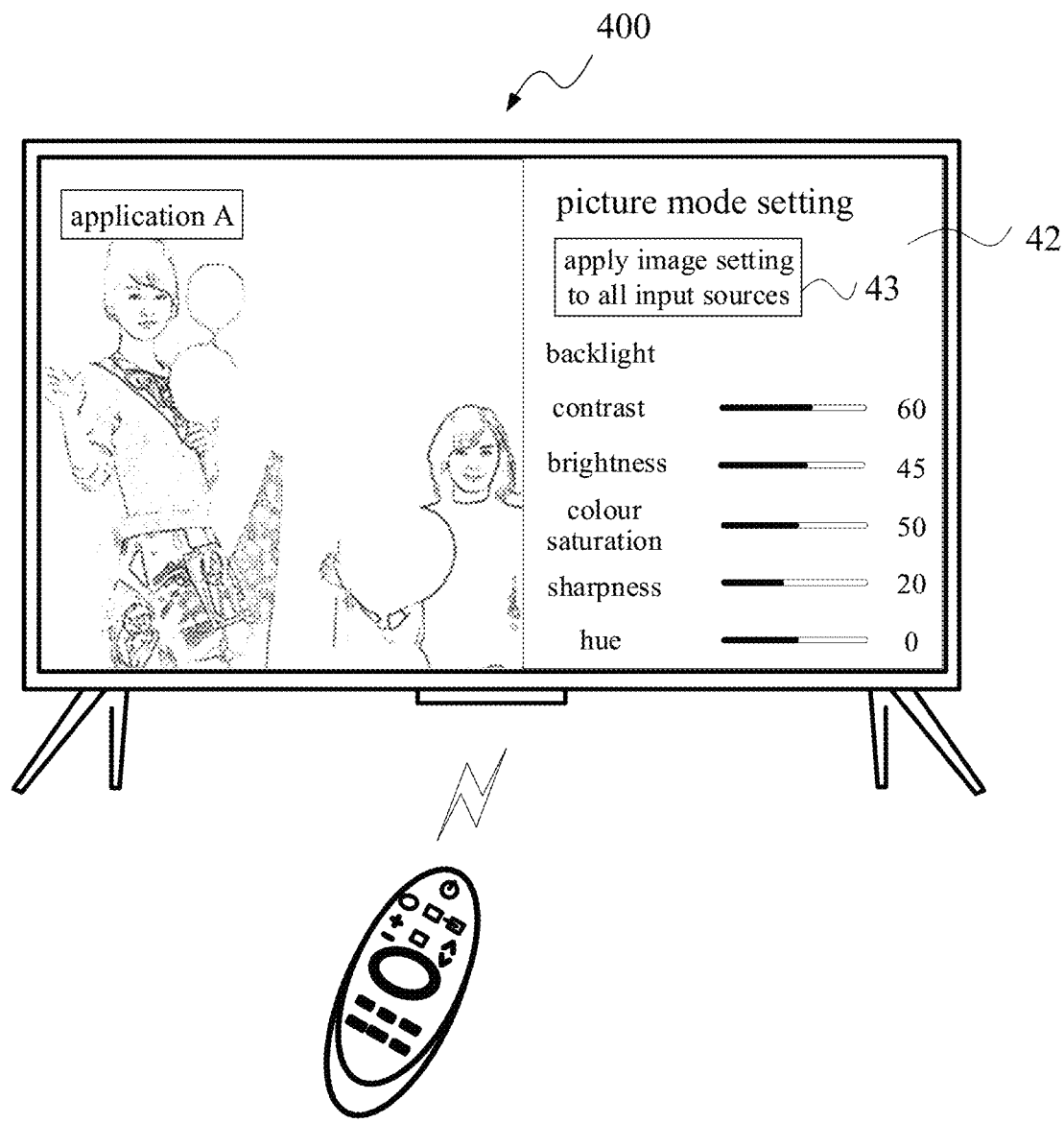

In some embodiments, in a case where the item "apply image setting to all input sources" is activated, the user again operates the control device to instruct the selector to select a sharpness item, the display apparatus, in response to a user input for adjusting the value of the sharpness item, modifies the value of the sharpness item, e.g., from 15 shown in FIG. 3E to 20 shown in FIG. 3F, and stores the value of 20 of the sharpness item in the current source; at the same time, the value 20 of this sharpness item is synchronously written and stored in other sources except the current source.

Figure 3G:
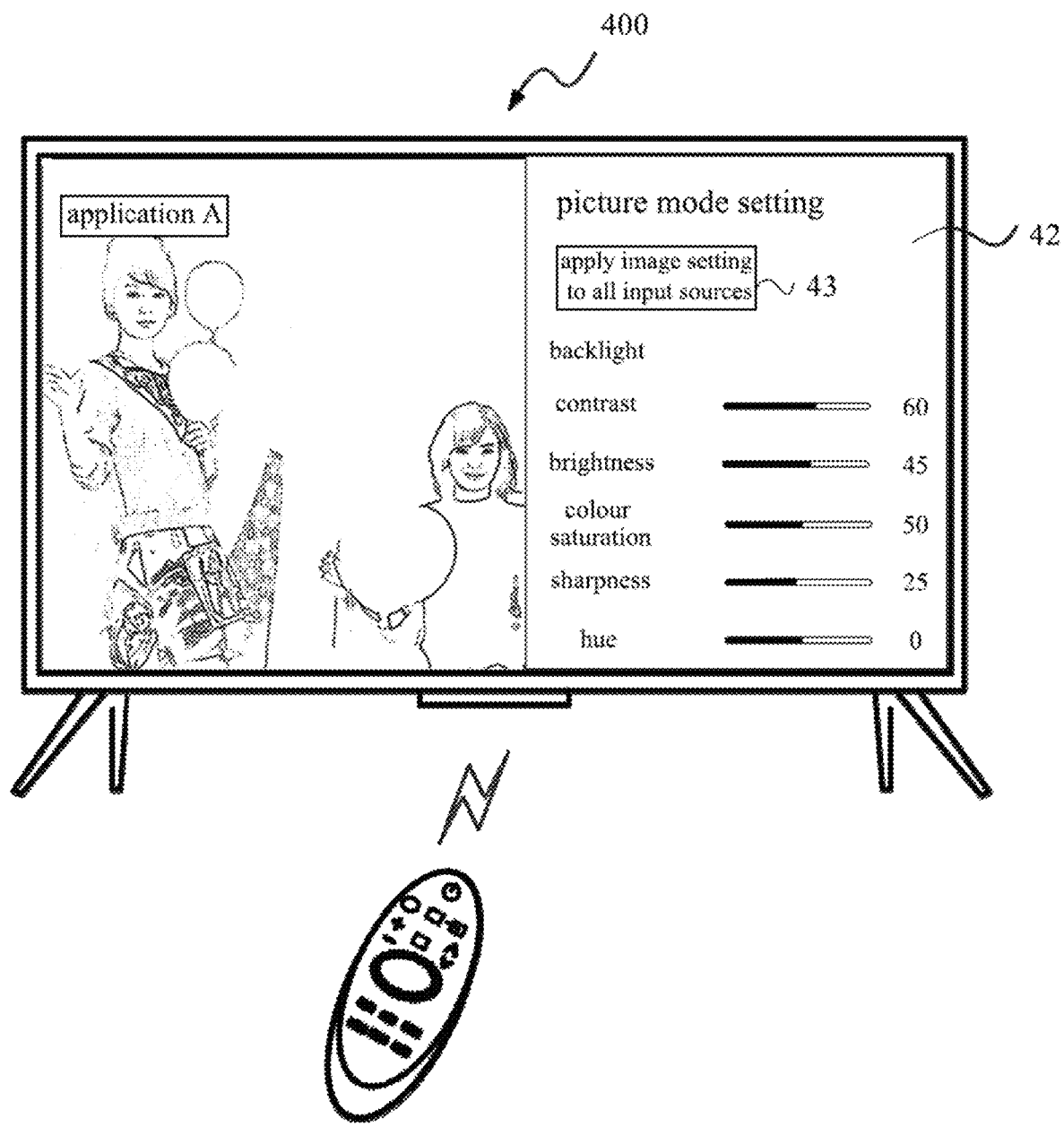

In some embodiments, in a case where the item "apply image setting to all input sources" is activated, the display apparatus continues to modify the value of the sharpness item, e.g., from 20 shown in FIG. 3F to 25 shown in FIG. 3G, in response to a user input for adjusting the value of the sharpness item, and stores the value 25 of the sharpness item in the current source; at the same time, the value 25 of this sharpness item is synchronously written and stored in other sources except the current source.

As shown in FIG. 3E, in some embodiments, in a case where the item "apply image setting to all input sources" is activated, the user operates the control device again to instruct the selector to select a sharpness item, the display apparatus modifies the value of the sharpness item, e.g., from 15 shown in FIG. 3E to 20 shown in FIG. 3F, in response to a user input for adjusting the value of the sharpness item, and stores the value 20 of the sharpness item in the current source.

In some embodiments, in a case where the item "apply image setting to all input sources" is activated, the display apparatus continues to modify the value of the sharpness item, e.g., from 20 as shown in FIG. 3F to 25 as shown in FIG. 3G, in response to a user input for adjusting the value of the sharpness item, and stores the value 25 of the sharpness item in the current source.

In some embodiments, when the item "apply image setting to all input sources" is activated, the user operates the control device to instruct the selector to select a hue item, and the display apparatus modifies the hue item value in response to a user input for adjusting the hue item value, and stores the hue item value in the current source; meanwhile, the value 25 of the sharpness item shown in FIG. 3G is synchronously written and stored in other sources except the current source.

The user then continues to play the screen shown in FIG. 3A by pressing a designated key on the control device, such as a back or exit key, causing the display apparatus to close the menu content 42 in response to the key input.

Figure 3H:
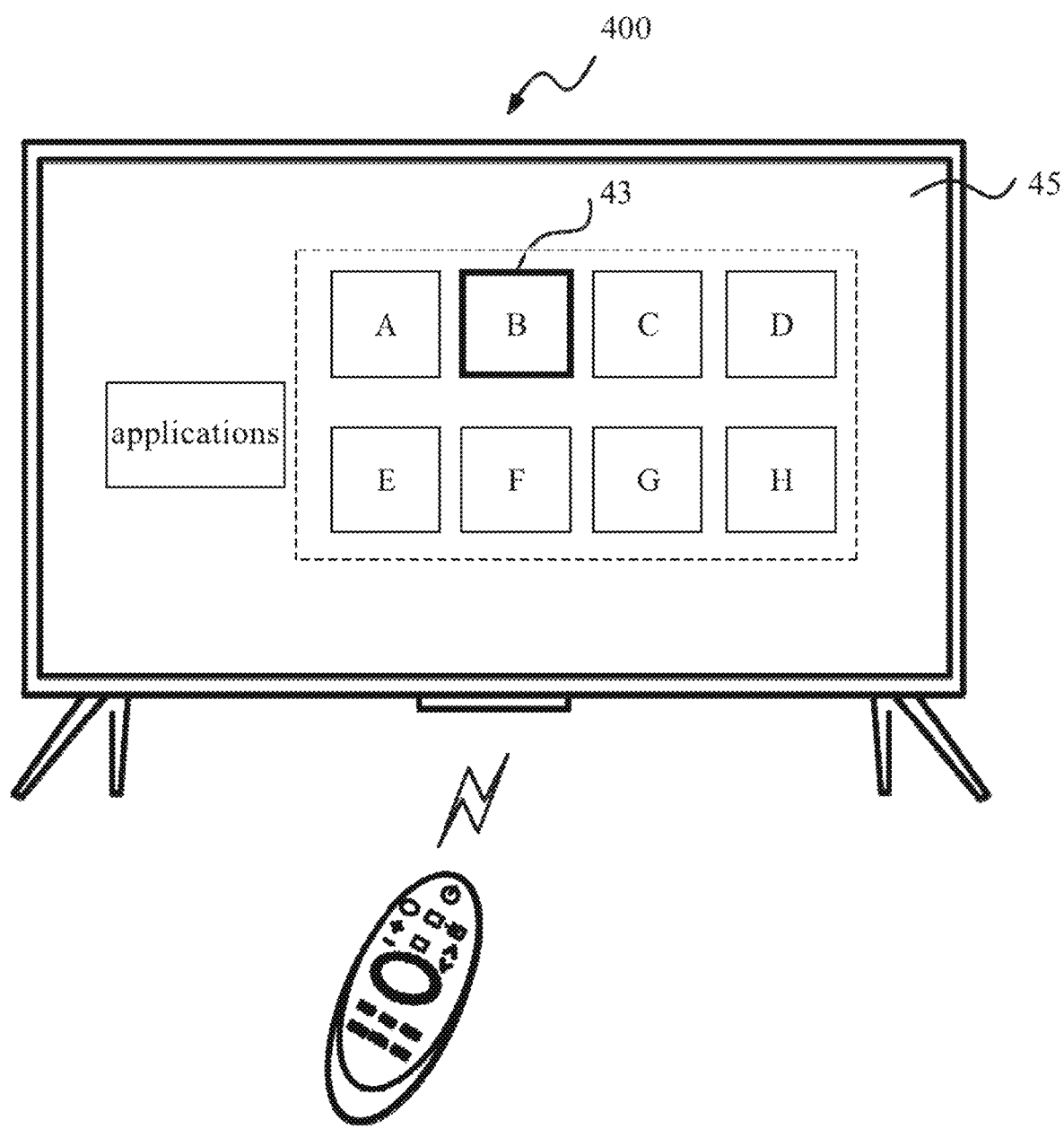
Figure 3I:
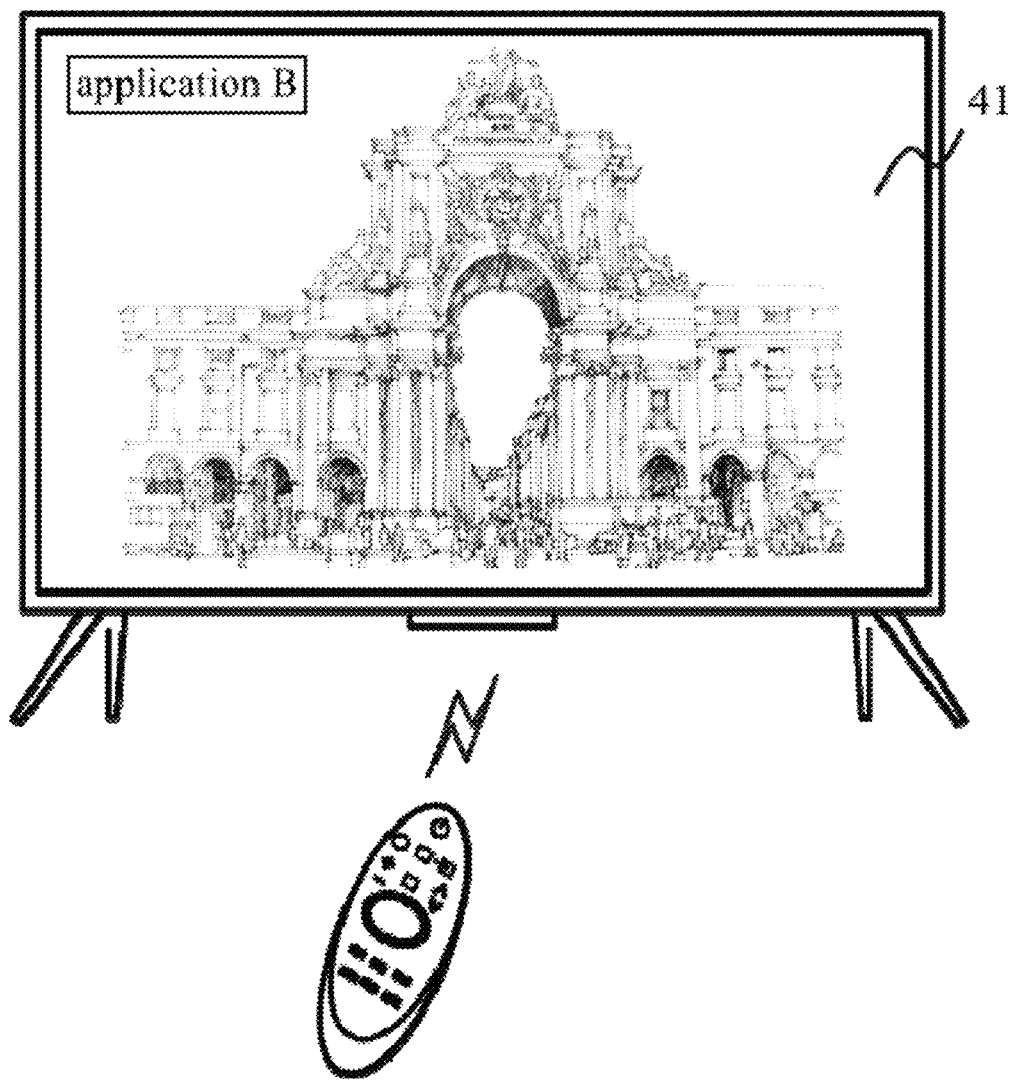

In some embodiments, as shown in FIG. 3A, a user presses a designated key on the control device, such as an application key, to cause the display apparatus to provide a GUI for the display in response to the key input, as shown in FIG. 3H. The GUI is an application list interface 45 provided by the display apparatus. Multiple applications, e.g., A, B, C, etc., are included within the application list interface 45 for a user to access service content provided by respective applications. For example, when the user operates the control device to instruct the selector 43 to select the item application B, and to activate the item application B, the display apparatus launches the application B in response to the user input, and at the same time displays the service content provided by the application B, for example, the play screen 41 shown in FIG. 3I.

Figure 3J:
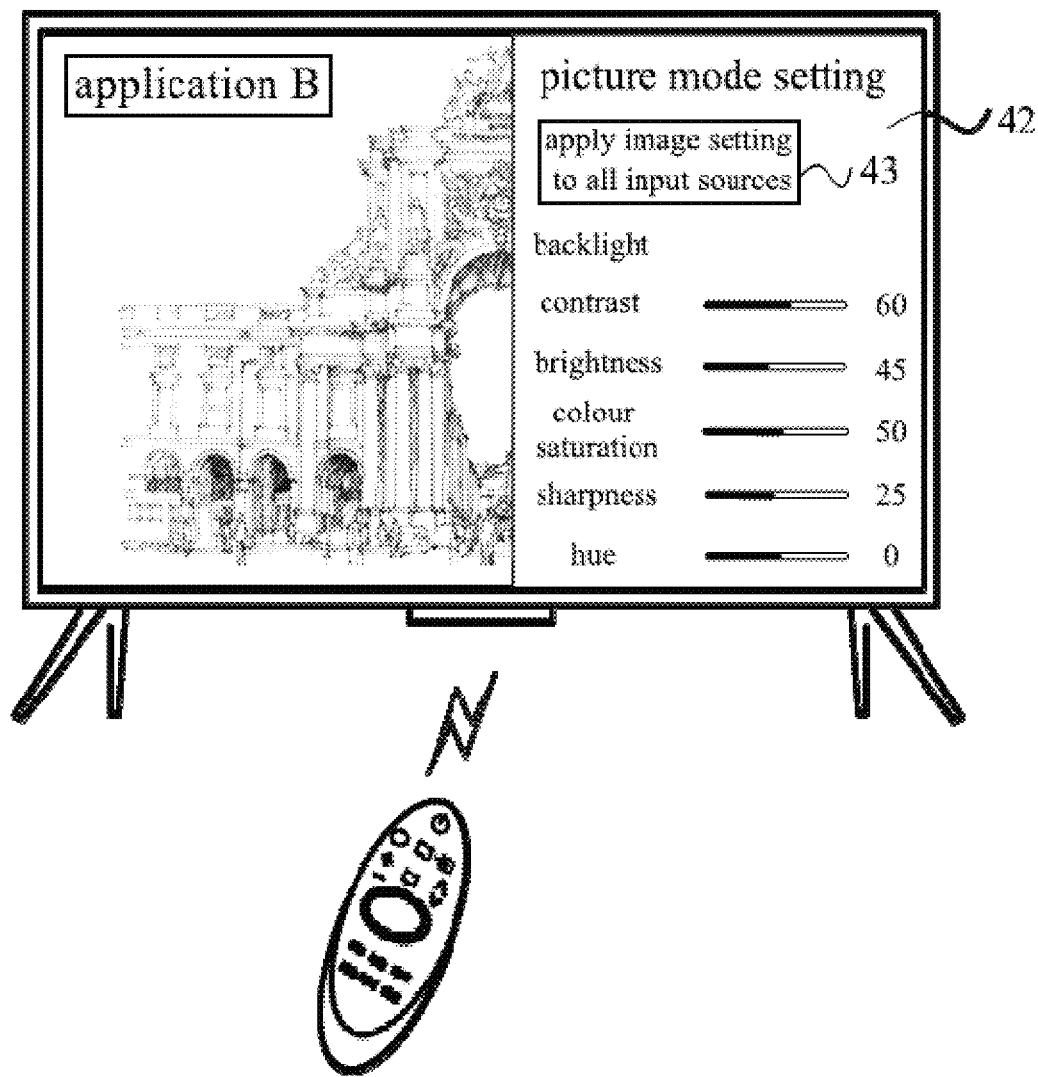

In some embodiments, the user presses a designated key on the control device, such as a setting key, to cause the display apparatus to provide a GUI for the display in response to the key input. Here, the GUI may include menu content as shown in FIG. 3J, wherein the value of each menu item in FIG. 3J is the same as the value of each menu item in FIG. 3G, i.e., the parameters associated with picture mode setting in application B are the same as the last modifications and setting in application A.

Figure 4A:
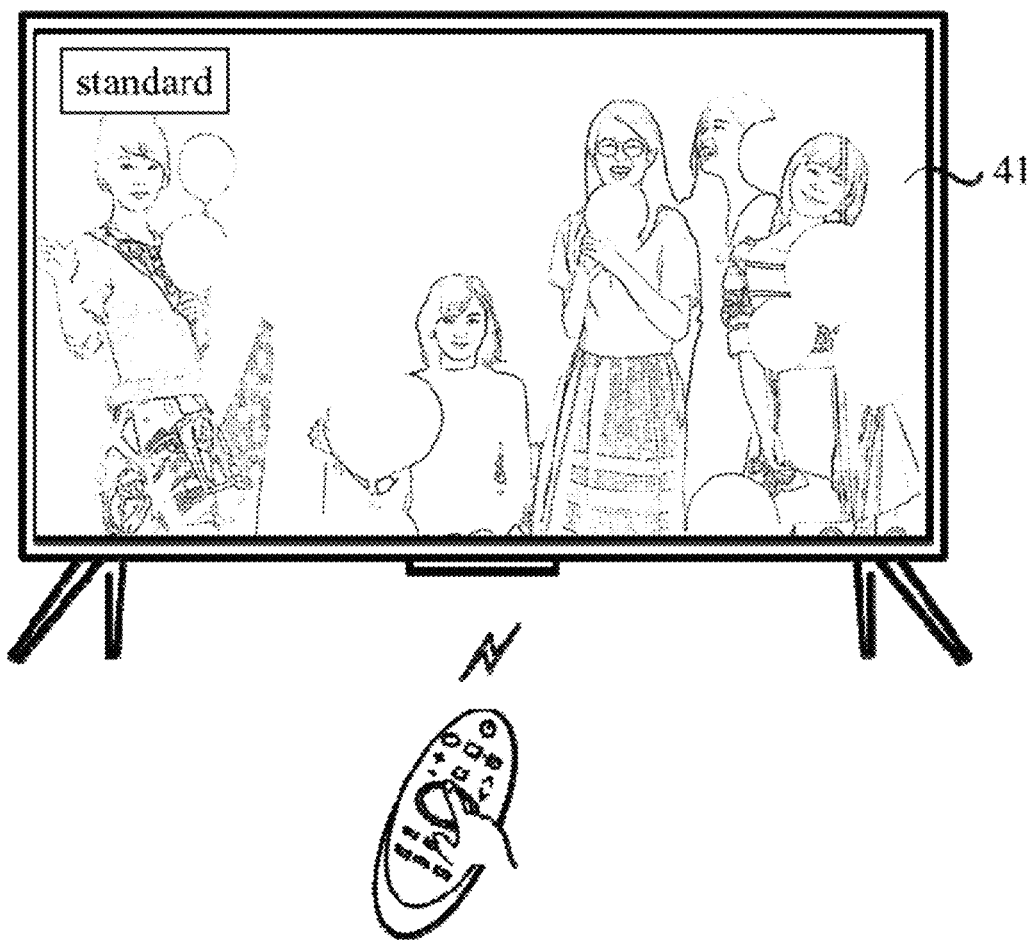
FIGS. 4A-4H illustrate schematic diagrams of a GUI provided by the display apparatus 200 by operating the control device 100 according to an embodiment of the present disclosure.

FIGS. 4A-4H illustrate schematic diagrams of a GUI provided by the display apparatus 200 by operating the control device 100. As shown in FIG. 4A, the display apparatus may provide the display with a play screen 41 of an input source under a standard picture mode, which may be at least one of an image, a text, and video content. For example, the playback screen shown in FIG. 4A is a picture screen.

In FIG. 4A, when a user wants to adjust the picture quality of a play screen presented on a display of a display apparatus, an adjustment instruction may be input by operating a control device, and the display apparatus may display menu content to be superimposed on a currently played screen in response to the user's input.

Figure 4B:
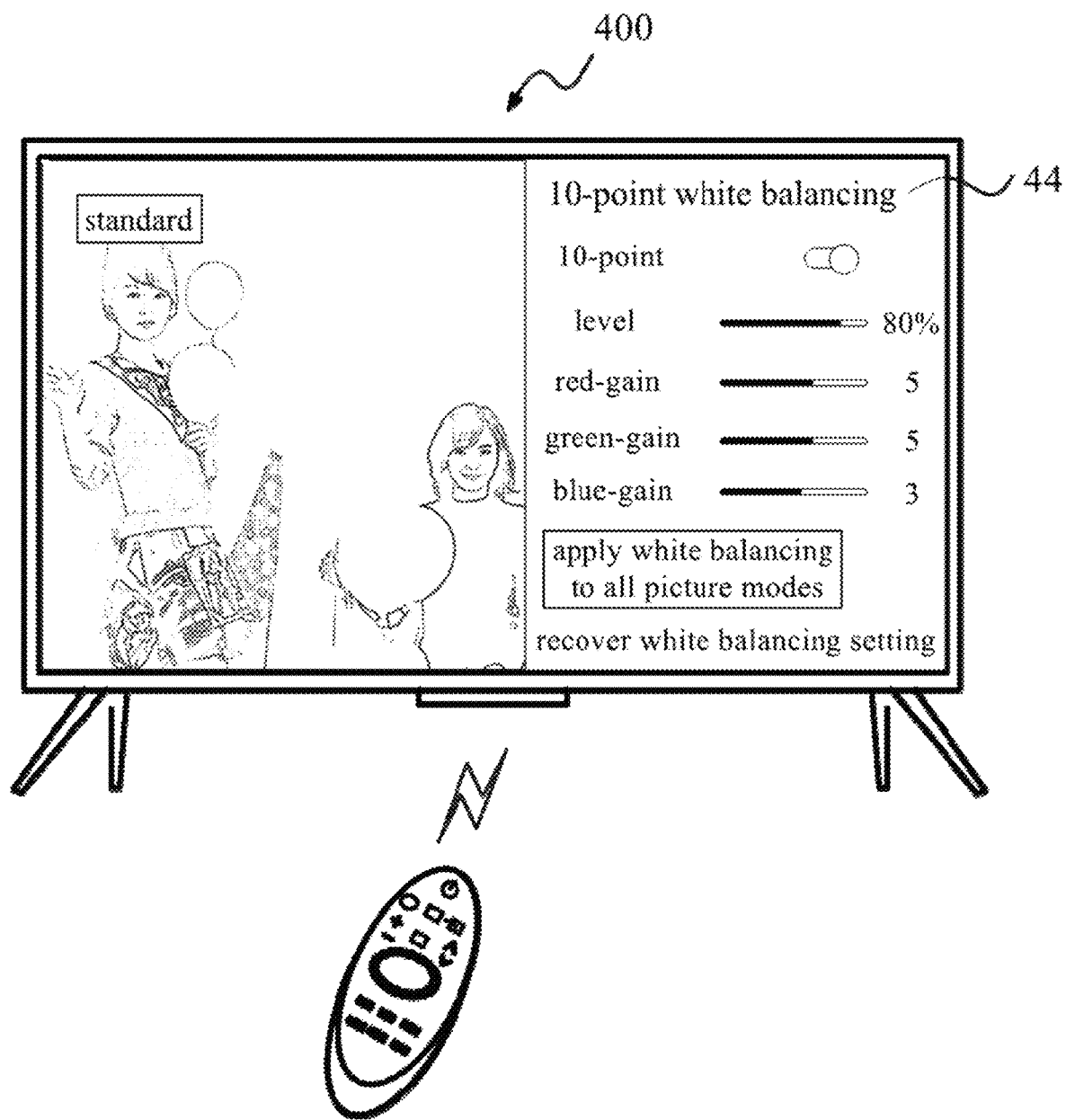

As shown in FIG. 4A, the user, by pressing a designated key on the control device, such as a set key, causes the display apparatus to provide the display with a GUI as shown in FIG. 4B in response to the key input, the GUI including menu content 44 and a selector 43 for indicating that a menu item in the menu content is selected.

Figure 4C:
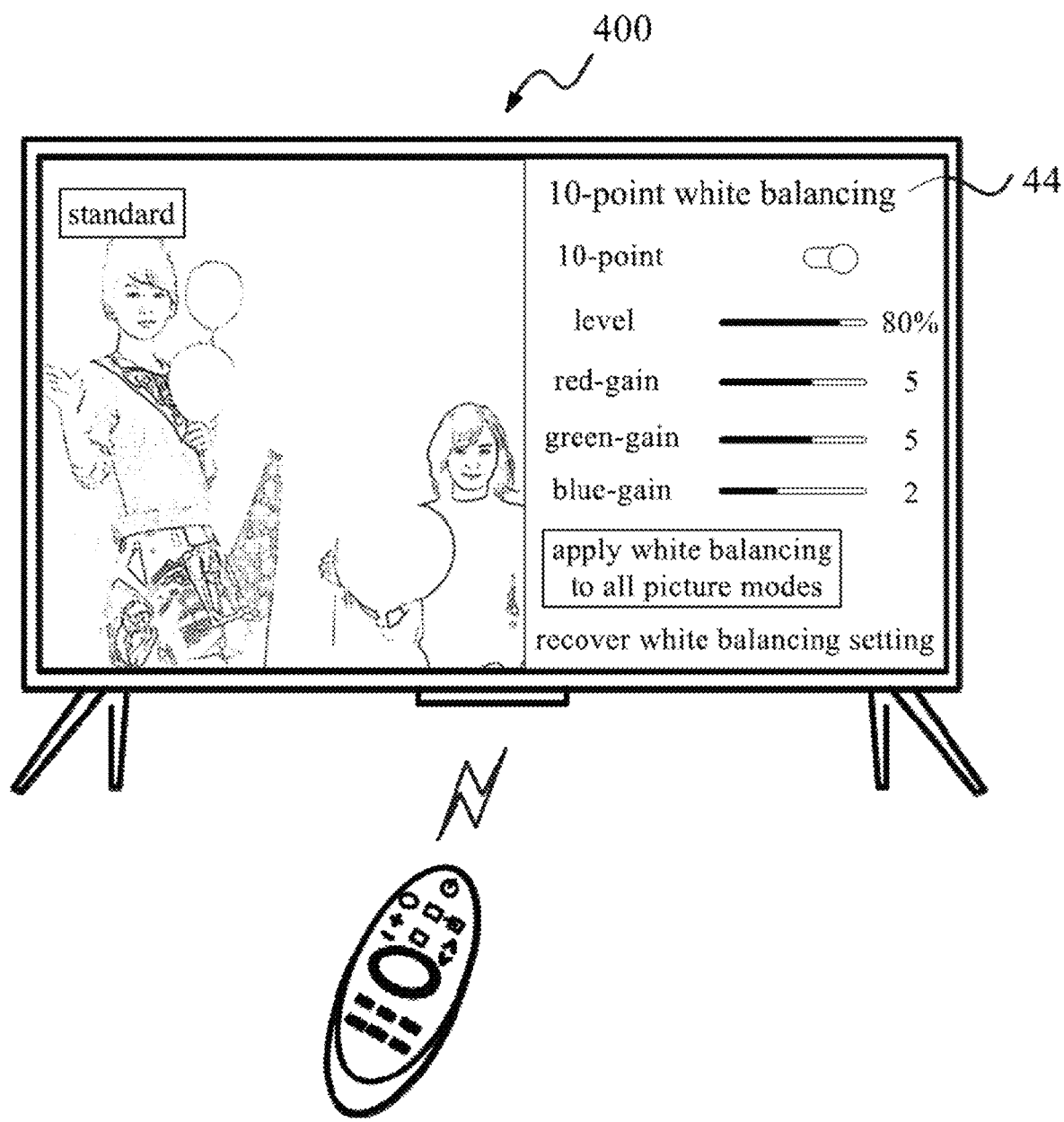

In FIG. 4B, the user instructs the selector 43 to select the blue-gain item by operating the control device, and the display apparatus modifies the menu content data corresponding to that blue-gain item, e.g. from 3 as shown in FIG. 4B to 2 as shown in FIG. 4C, in response to a user input for adjusting the value of the blue-gain item, and stores the value 2 for the blue-gain item in the current source. At this time, the user operates the control device to instruct the selector 43 to select the item "apply white balancing to all picture modes", e.g. pressing a down key on the control device, the user then operates the control device to confirm the item "apply white balancing to all picture modes" where the selector falls, for example, pressing an OK key on the control device, the display apparatus, in response to the user input, synchronously writes and stores menu content data corresponding to items in the menu content 44 to other sources except the current source, for example menu items: signal level 80%, red-gain value 5, green-gain value 5, blue-gain value 2; while still keeping the selector staying on the item "apply white balancing to all picture modes".

Figure 4D:
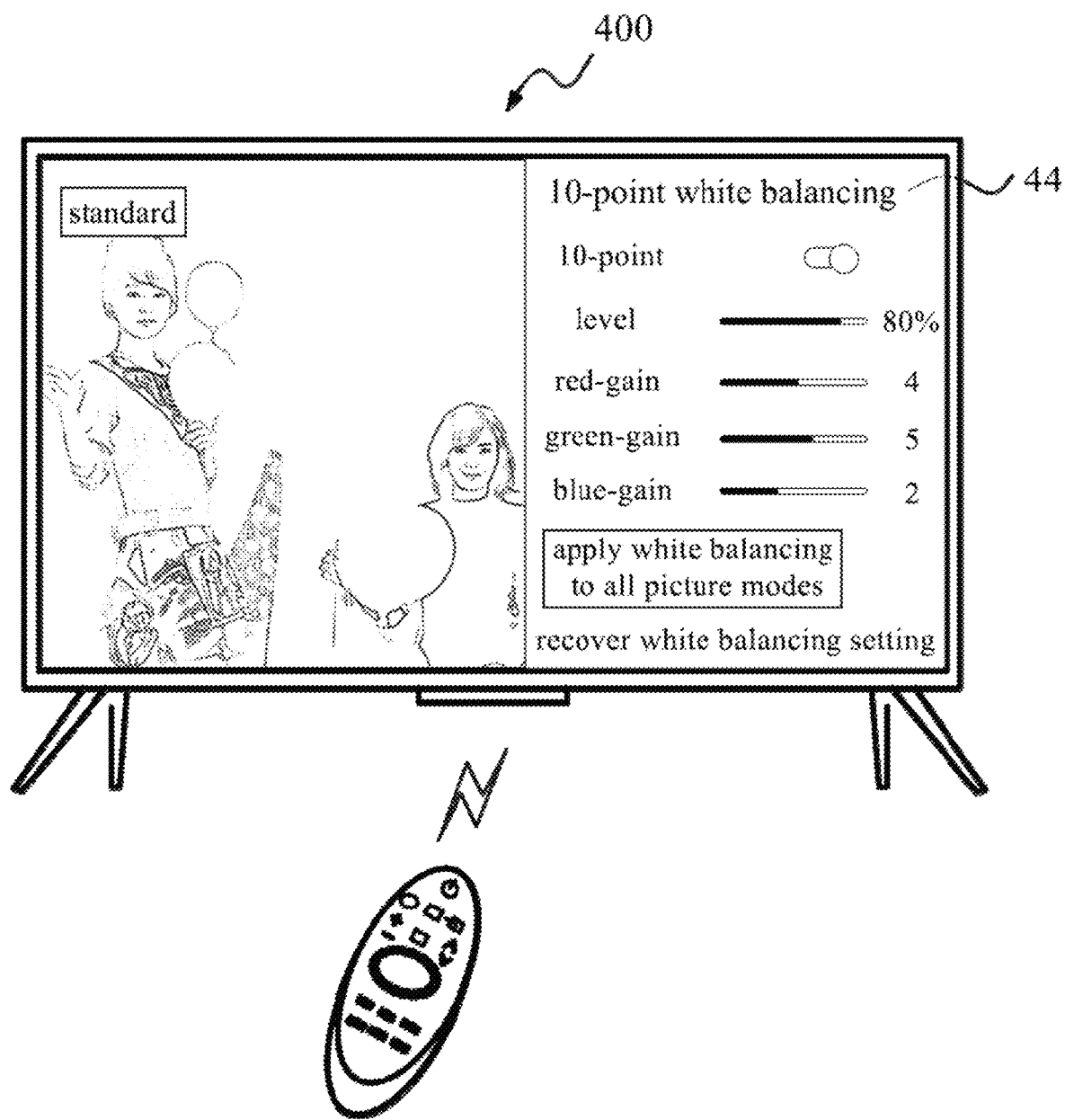

In some embodiments, in a case where the item "apply white balancing to all picture modes" is activated, the user operates the control device again to instruct the selector to select the red-gain item, the display apparatus modifies the value of the red-gain item, e.g., from 5 as shown in FIG. 4C to 4 as shown in FIG. 4D, in response to a user input for adjusting the value of the red-gain item, and stores the value 4 for the red-gain item under the current source; at the same time, the value 4 for this red-gain is synchronously written and stored to other sources except the current source.

Figure 4E:
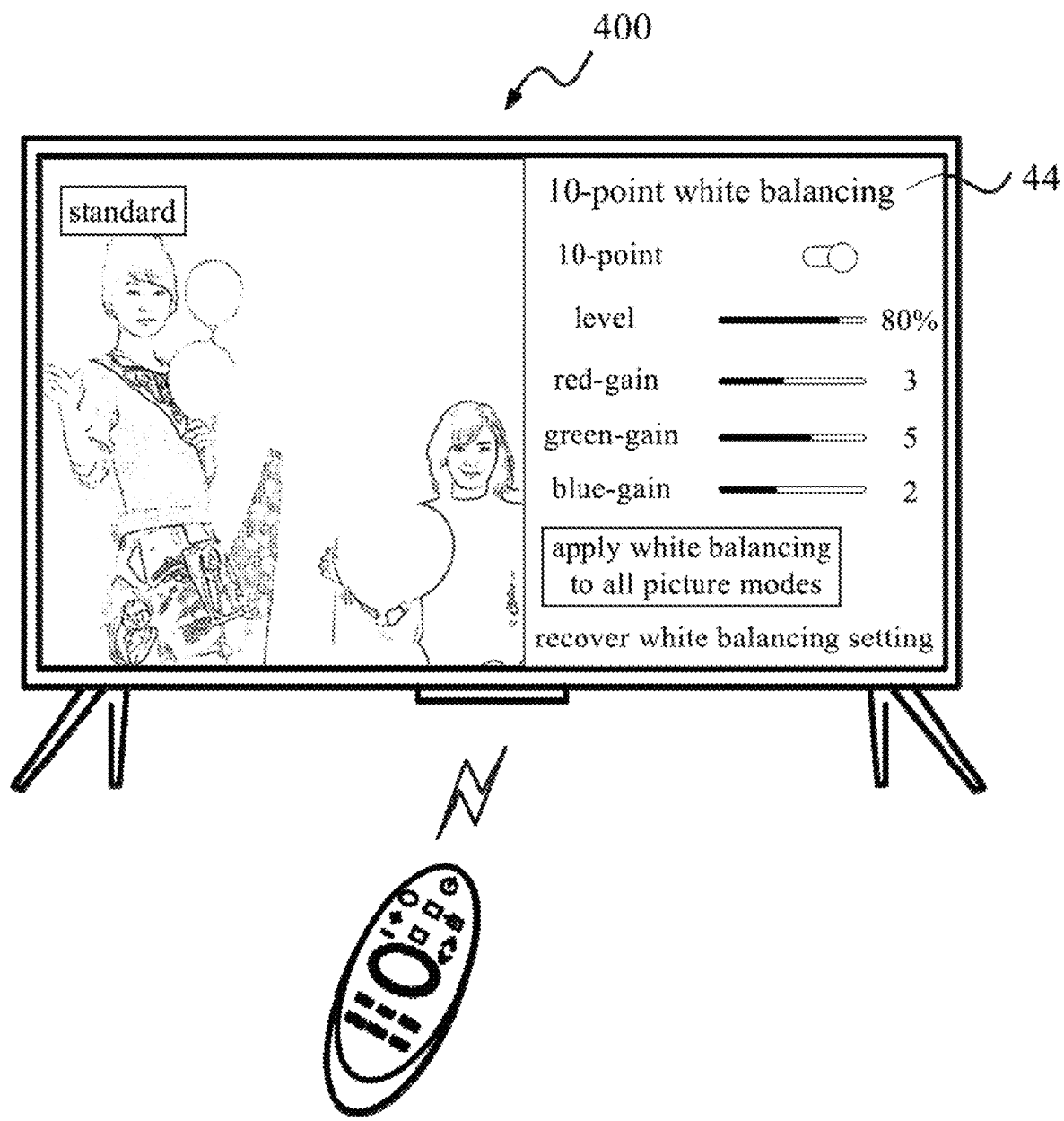

In some embodiments, when the item "apply white balancing to all picture modes" is activated, the display apparatus continues to modify the value of the red-gain item, e.g., from 4 as shown in FIG. 4D to 3 as shown in FIG. 4E, in response to a user input for adjusting the value of the red-gain item, and stores the value 3 for the red-gain item in the current source; at the same time, the value 3 for this red-gain is synchronously written and stored to other sources except the current source.

The user then continues to play the screen shown in FIG. 4A by pressing a designated key on the control device, such as a back or exit key, causing the display apparatus to close the menu content 44 in response to the key input.

Figure 4F:
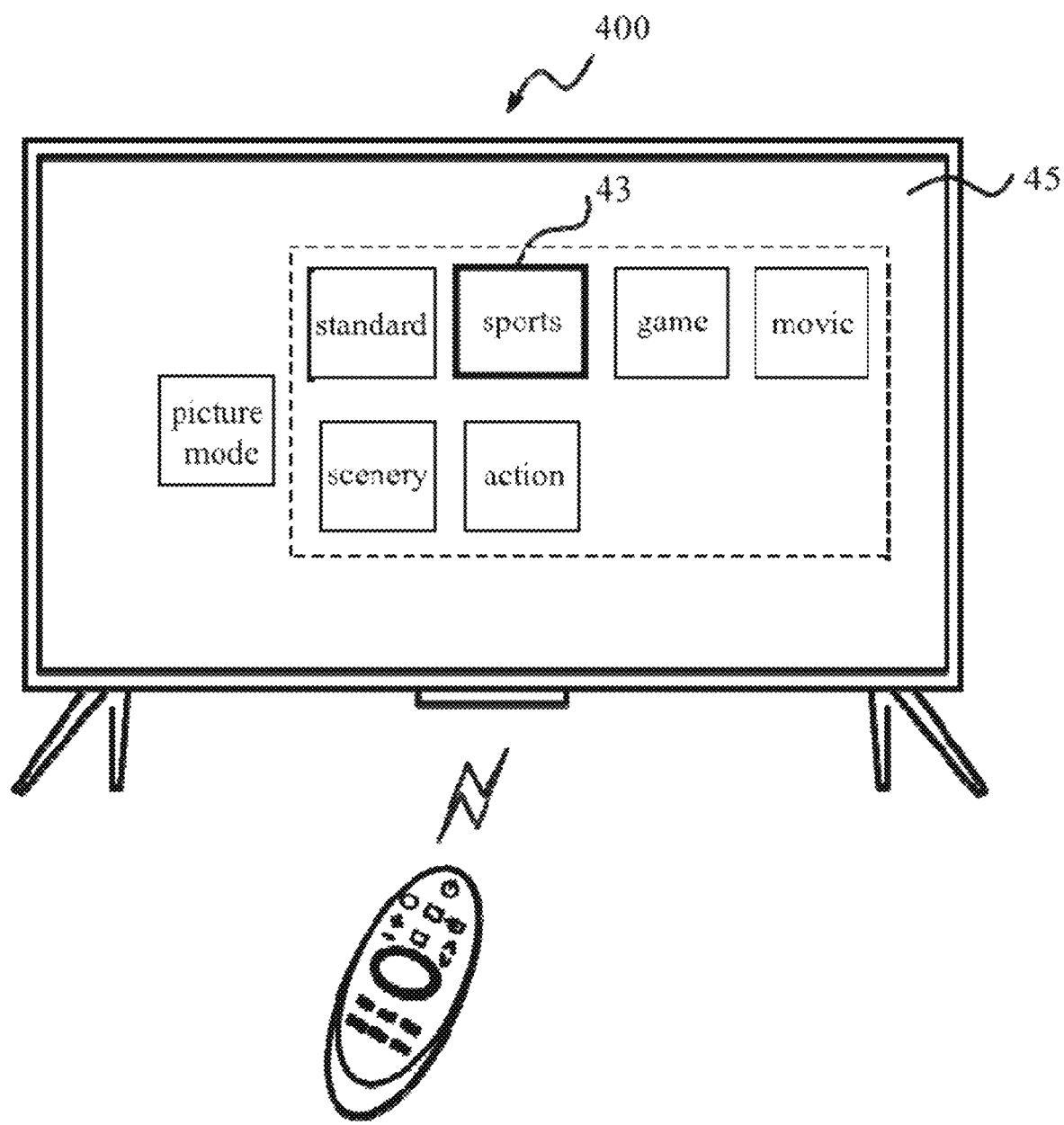
Figure 4G:
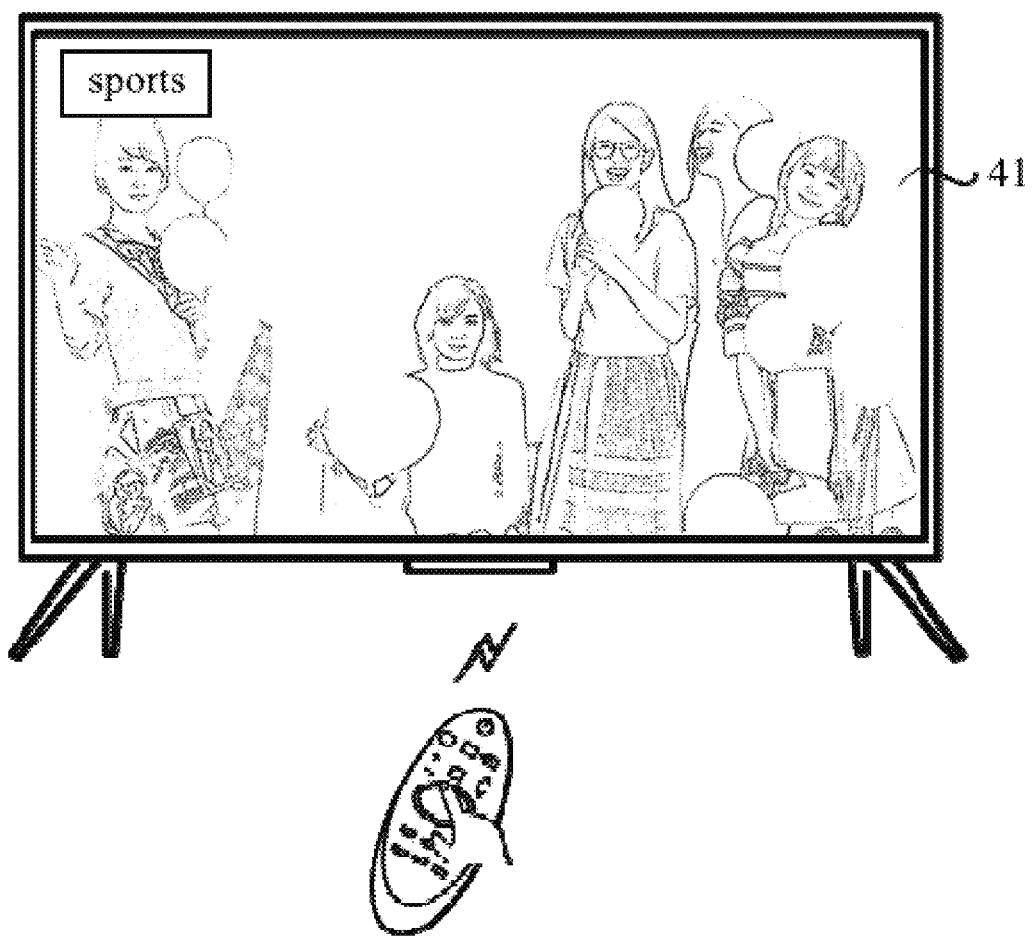

In some embodiments, as shown in FIG. 4A, a user presses a designated key on the control device, such as a picture mode key, to cause the display apparatus to provide a GUI, as shown in FIG. 4F for the display in response to the key input. The GUI is an picture mode list interface 45 provided by the display apparatus, wherein multiple picture modes, e.g., standard, movement, games, etc., are included within the picture mode list interface 45 for a user to view respective types of service content provided by the input source in different picture modes. For example, the user operates the control device to instruct the selector 43 to select an item moving picture mode, and activates the item moving picture mode, the display apparatus switches the picture mode from the standard picture mode to the moving picture mode in response to the user input, while displaying the service content provided by the input source in the moving picture mode, for example, the playback screen 41 illustrated in FIG. 4G.

Figure 4H:
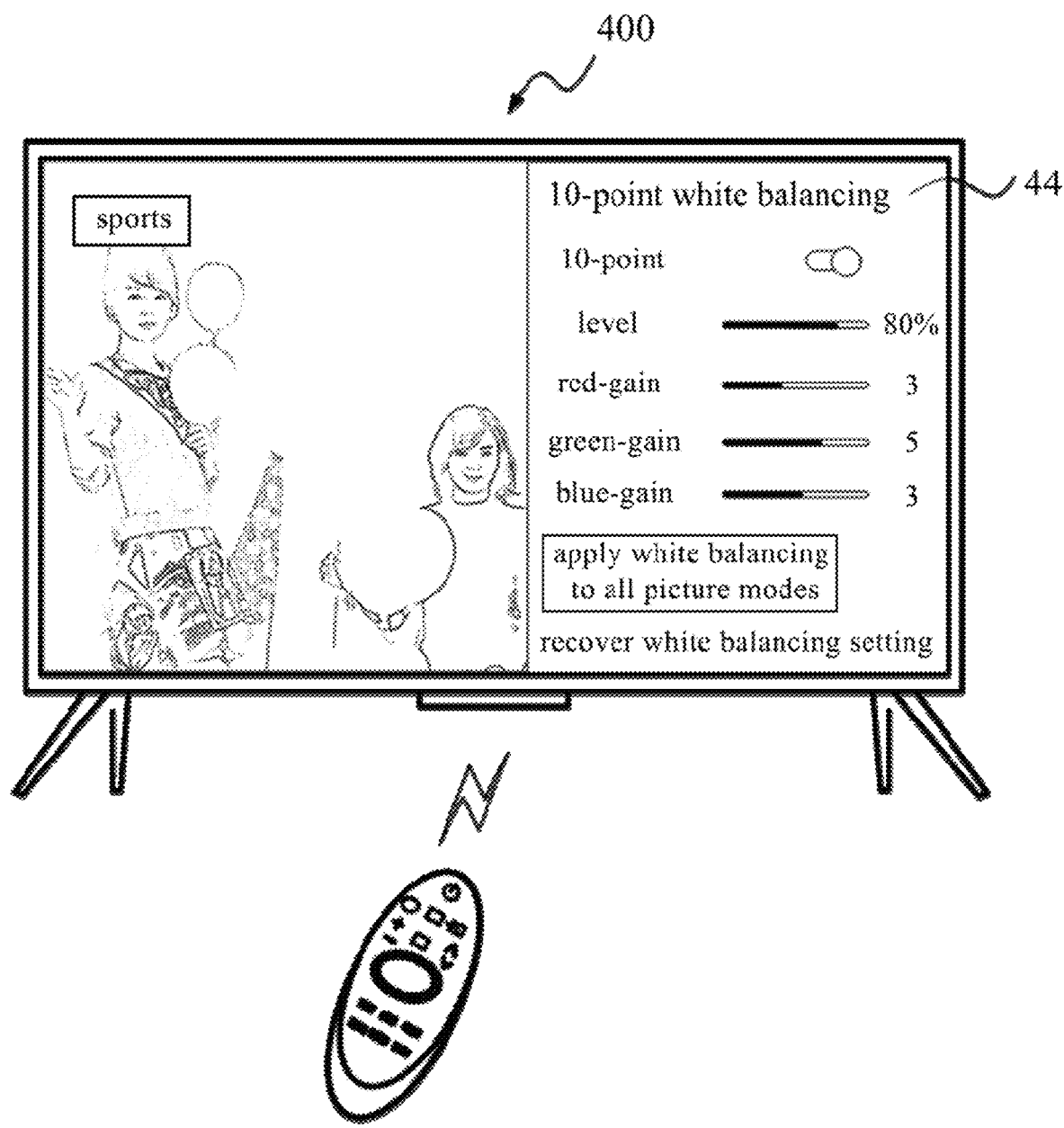

In some embodiments, the user presses a designated key on the control device, such as a setting key, to cause the display apparatus to provide a GUI for the display in response to the key input. Here, the menu content included in the GUI may be as shown in FIG. 4H, in which the numerical value of each menu item in FIG. 4H is the same as the numerical value of each menu item in FIG. 4E, i.e., the parameters related to 10-point white balance in the moving picture mode are consistent with the last modification and setting in the standard picture mode.

It should be noted that the above "picture setting" function can be applied as "all input sources" or as "current input source"; similarly, the "adopt white balance" function described above can be applied as "all picture modes" and also as "current picture mode". These can be configured according to user needs.

In the embodiments described above, it is convenient for a user to sync menu content data set in the current source to other sources so that the user does not need to repeatedly modify menu content data in different sources.

Figure 5:
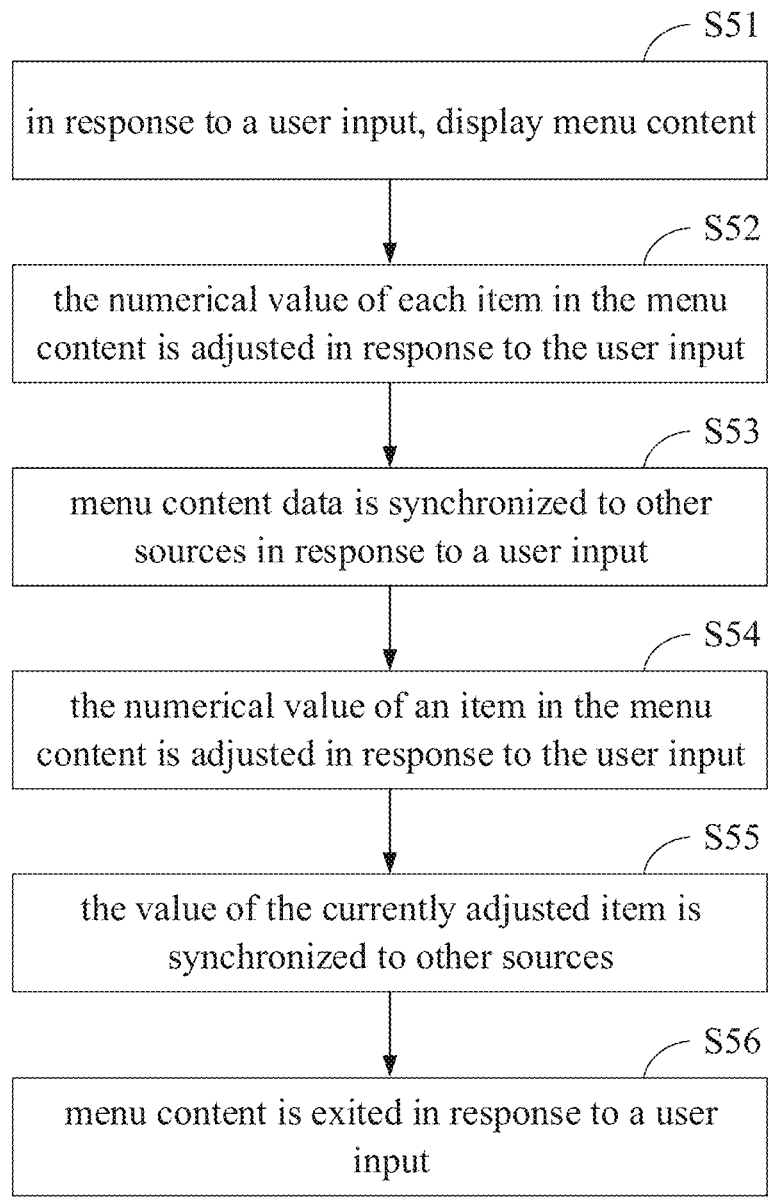
FIG. 5 illustrates an implementation flow of synchronizing menu content data by a display apparatus according to an embodiment of the present disclosure.

As an example, FIG. 5 illustrates an implementation flow of synchronizing menu content data by a display device. the implementation flow includes the following steps S51 to S56.

Step S51: in response to a user input, display menu content. For example, the menu content 44 is shown in FIG. 4B.

Step S52: the numerical value of each item in the menu content is adjusted in response to the user input. For example, in FIG. 4B, the selector 43 selects an item in the menu content 44 except the item "apply white balancing to all picture modes", such as the "blue-gain" item. In response to an adjustment instruction input from the user, the numerical value of the item "blue-gain" is adjusted, e.g., 3 as shown in FIG. 4B is modified to 2 as shown in FIG. 4C, and stored in the current source.

Step S53: menu content data is synchronized to other sources in response to a user input. For example, in FIG. 4C, the selector 43 selects the item "apply white balancing to all picture modes" in the menu content 44, and in response to a user's selection for confirmation through the control device, the display apparatus sets an indicator for indicating applying to all sources, and stores the indicator in the current source. Meanwhile, data in the menu content 44 is synchronized to other sources, for example menu items: level-on, red-gain value 5, green-gain value 5, blue-gain value 2.

Here, the synchronization process may be all picture modes under all input sources or all picture modes under the current source, and the embodiments are not limited.

The 10-point white balance menu content 44 shown in FIG. 4C is still taken as an example. The menu content 44 includes 32 items which comprise a 10 point white balance on/off, apply white balancing to all picture modes, and 30 red, green, and blue data items (10 levels, each level with a red data item, a green data item, and a blue data item).

Figure 6:
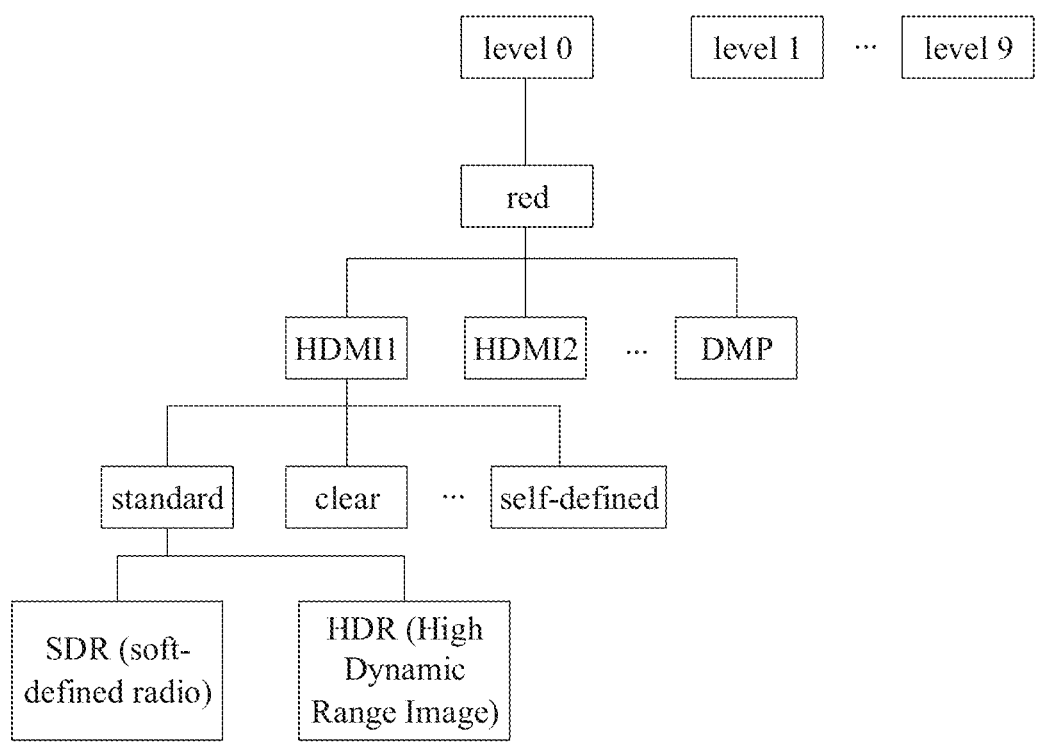
FIG. 6 illustrates the correspondence between a data item red and a source according to an embodiment of the present disclosure.

The current display apparatus include 15 channels, 7 picture modes, and 2 signal types, i.e., including 15×7×2=210 sources. Taking the red data item as an example, the correspondence of this red data item to the source is shown in FIG. 6. Since the red data item has corresponding 10 signal levels, each level has a value of the red data item, i.e., the red data item has 10 values for each level. The 10 values of the red data item are to be stored under each source, so the amount of data required to be stored is 210×10=2100. The 2100 data may be stored in an array structure consisting of 2100 elements, which is located in memory.

Figure 7:
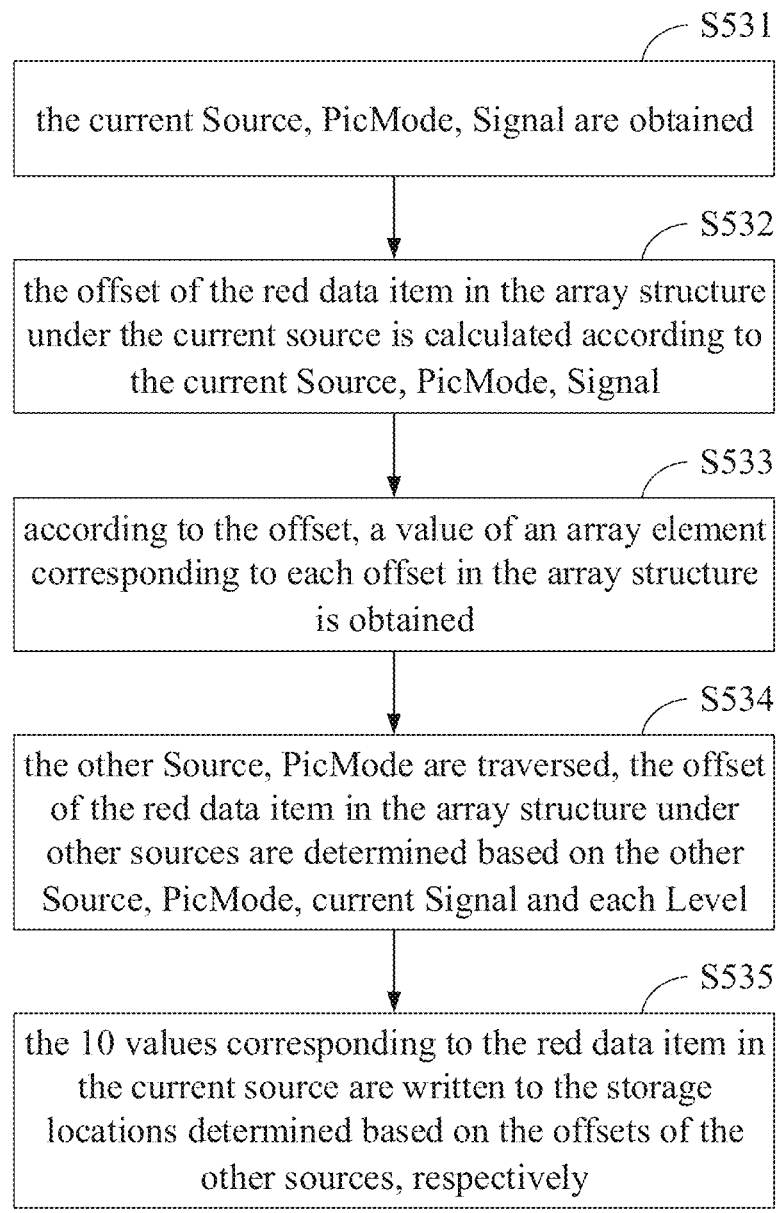
FIG. 7 illustrates an implementation flow of synchronizing the data item red to other sources by a display device according to an embodiment of the present disclosure.

The display apparatus has stored the numerical value of each item in the current source when the numerical value of each item is adjusted by step S52. The display apparatus needs to perform operations synchronized to other sources for each item in the menu content 44. FIG. 7 illustrates an implementation flow of synchronizing the red data item to other sources by the display apparatus. The implementation flow includes the following steps S531-S535.

Step S531: the current Source, PicMode, Signal are obtained.

Step S532: the offset of the red data item in the array structure under the current source is calculated according to the current Source, PicMode, Signal. Since the red data item has 10 corresponding levels, 10 offsets may be determined based on each level in the current source.

Step S533: according to the offset, a value of an array element corresponding to each offset in the array structure is obtained, that is, 10 numerical values corresponding to the red data item in the current source are acquired.

Step S534: the other Source, PicMode are traversed, the offset of the red data item in the array structure under other sources are determined based on the other Source, PicMode, current Signal and each Level. Each source corresponds to 10 offsets.

Step S535: the 10 values corresponding to the red data item in the current source are written to the storage locations determined based on the offsets of the other sources, respectively.

By steps S531-S535 described above, synchronization of the red data item is done. The synchronization processes of other data items are the same until synchronization of all items in the menu content 44 is completed.

Step S54: the numerical value of an item in the menu content is adjusted in response to the user input. For example, in response to the user input, the value of the "red-gain" item at the current Level (denoted as Level0) is readjusted and stored under the current source.

Figure 8:
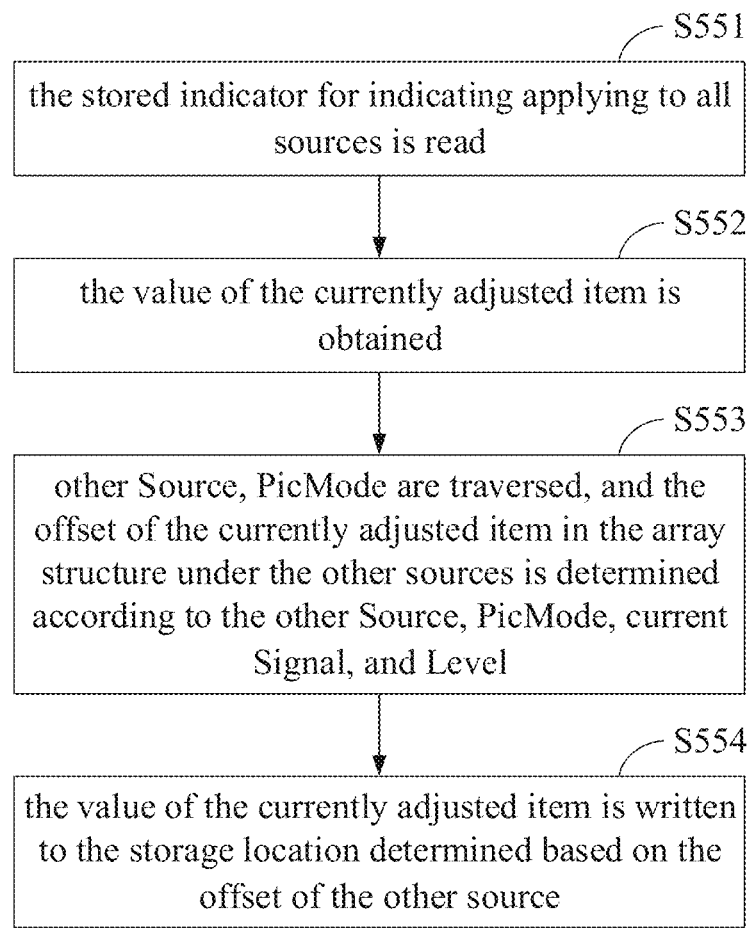
FIG. 8 illustrates an implementation flow of synchronizing values of currently adjusted items to other sources by a display device according to an embodiment of the present disclosure.

Step S55: the value of the currently adjusted item is synchronized to other sources. FIG. 8 illustrates an implementation flow of synchronizing values of currently adjusted items to other sources by a display apparatus. The implementation flow includes the following steps S551-S554.

Step S551: the stored indicator for indicating applying to all sources is read. If the indicator for indicating applying to all sources is selected, i.e. the item "applying white balancing to all picture modes" is selected, step S552 is performed.

Step S552: the value of the currently adjusted item is obtained.

Step S553: other Source, PicMode are traversed, and the offset of the currently adjusted item in the array structure under the other sources is determined according to the other Source, PicMode, current Signal, and Level0.

Step S554: the value of the currently adjusted item is written to the storage location determined based on the offset of the other source.

Through steps S551-S554, synchronization of the current item is completed. The display apparatus may continue to adjust the numerical values of other items in response to the user input, S551-S554 are repeated.

Step S56: menu content is exited in response to a user input. For example, the menu content 44 is exited in response to a user input.

It should be noted that the menu content may be related to display parameters of the source input content on the display, e.g., image quality data. That is, the display effect of the input content on the display can be changed by adjusting the menu content.

When the display apparatus switches from a current source to other sources in response to a user input, the content input in other sources can reach the same display effect as the current source since the above-described synchronization operation is performed before switching.

As can be seen, this embodiment facilitates user use by synchronizing menu content data modified in a current source to other sources such that the user does not need to repeatedly modify menu content data in different sources.

In another embodiment, as shown in FIG. 4A, the user causes the display apparatus to provide the display with a GUI as shown in FIG. 4B including menu content 44 and a selector 43 for indicating selection of a menu item in the menu content by pressing a designated key on the control device, such as a setting key.

In FIG. 4B, the user instructs the selector 43 to select a blue-gain item by operating the control device, and the display apparatus modifies the menu content data corresponding to the blue-gain item, e.g. from 3 shown in FIG. 4B to 2 shown in FIG. 4C, in response to a user input for adjusting the value of the blue-gain item. At this time, the user operates the control device to instruct the selector 43 to select the item "apply white balancing to all picture modes", for example, pressing a down key on the control device and then operating the control device to confirm activation of the selected item "apply white balancing to all picture modes", e.g., pressing an OK key on the control device, and in response to the user input, the display apparatus still holds the selector on the item "apply white balancing to all picture modes".

In some embodiments, in a case where the item "apply white balancing to all picture modes" is activated, once again, the user operates the control display to instruct the selector to select the red-gain item, the display apparatus modifies the value of the red-gain item, e.g., from 5 as shown in FIG. 4C to 4 as shown in FIG. 4D, in response to user input for adjusting the value of the red-gain item, and stores the value 4 for the red-gain item in the current source.

In some embodiments, with the "white balance all picture modes" item activated, the display apparatus continues to modify the value of the red-gain item, e.g., from 4 as shown in FIG. 4D to 3 as shown in FIG. 4E, and store the value 4 for the red-gain item in the current source in response to a user input for adjusting the value of the red-gain item.

Then, the user presses a designated key on the control device, for example, a back key, to cause the display device to close the menu content 44 in response to the key input and continue to play the picture shown in FIG. 4A while simultaneously writing and storing menu content data corresponding to items in the menu content 44 shown in FIG. 4E to other sources except the current source, such as menu items: Level 80%, red-gain value 3, green-gain value 5, blue-gain value 2.

In the embodiments described above, the display apparatus does not synchronize data in the menu content to other sources when the user makes modifications to the menu content, but only synchronizes data in the menu content to the other sources in response to user input for closing the menu content.

Figure 9:
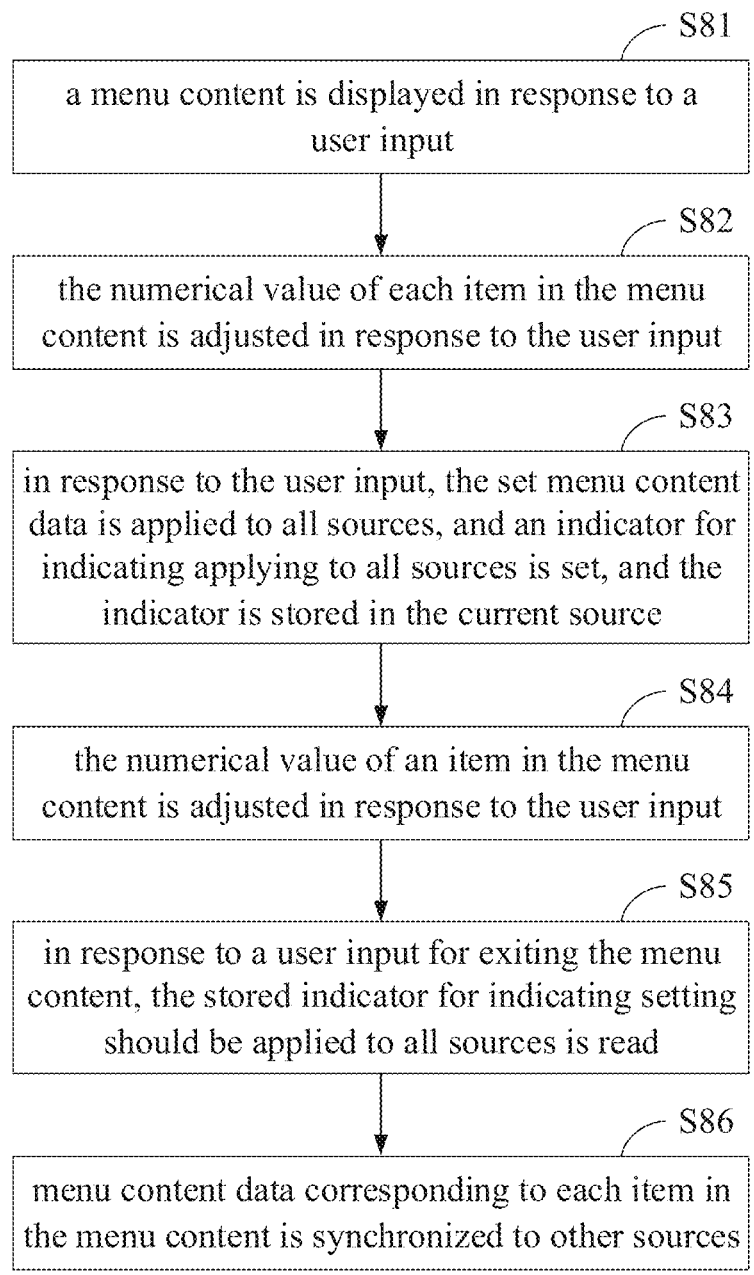
FIG. 9 illustrates an another implementation flow of synchronizing menu content data by a display device according to an embodiment of the present disclosure.

As another example, FIG. 9 illustrates an another implementation flow of synchronizing menu content data by a display apparatus. The implementation flow includes S81 to S86.

Step S81: a menu content is displayed in response to a user input. For example, the menu content 44 is shown in FIG. 4B.

Step S82: the numerical value of each item in the menu content is adjusted in response to the user input. For example, in FIG. 4B, the selector 43 selects an item in the menu content 44 except the item "apply white balancing to all picture modes", such as the "blue-gain" item. In response to an adjustment instruction input from the user, the numerical size of the "blue-gain" item is adjusted, e.g., the numerical size is modified from 3 as shown in FIG. 4B to 2 as shown in FIG. 4C, and stored in the current source.

Step S83: in response to the user input, the set menu content data is applied to all sources, and an indicator for indicating applying to all sources is set, and the indicator is stored in the current source. For example, in FIG. 4C, the selector 43 selects the item "apply white balancing to all picture modes" in the menu content 44, and in response to the user's confirmation of the selection through the control device, the display apparatus sets an indicator for indicating setting should be applied to all sources, and stores the indicator in the current source.

Step S84: the numerical value of an item in the menu content is adjusted in response to the user input. For example, in response to a user input, the value of the "red-gain" item at the current level (denoted as level0) is readjusted and stored under the current source.

Step S85: in response to a user input for exiting the menu content, the stored indicator for indicating setting should be applied to all sources is read. If the indicator indicates applying to all sources has been selected, step S86 is performed. For example, in FIG. 4E, in response to an input for exiting the menu content 44 from a user, the display apparatus reads the stored indicator for indicating applying to all sources. If the indicator indicates applying to all sources has been selected, i.e. it is determined that item "apply white balancing to all picture modes" is selected, step S86 is performed. Meanwhile, the menu content 46 is closed.

Step S86: menu content data corresponding to each item in the menu content 46 is synchronized to other sources. Referring specifically to the flow shown in FIG. 7, data synchronization of all items in the menu content 44 is completed.

As can be seen, in this embodiment, the display apparatus does not synchronize data to other sources when the user inputs the instruction for indicating applying to all sources through the control device. The later input modification for a single item of menu content data, the display apparatus does not synchronize data to other sources. The display apparatus synchronizes all data in the menu content to other sources only when the menu content is closed. The implementation mode of the embodiment will not make the user perceive the time consumption of synchronizing data, and avoid the phenomenon of time consumption and UI jamming when adjusting certain menu content data for many times and synchronizing the current menu content data for many times at the same time under the condition that the user has selected the item of application to all sources.

The effect of this embodiment is now still illustrated by taking 10-point white balance menu content as an example. As shown in FIG. 4E, the 10-point white balance menu content 44 includes 10 Levels, each including 3 data items, red data item, green data item and blue data item, for a total of 3×10=30 data items. The display apparatus needs to synchronize the numerical values of these 30 data items to other sources. Here, assuming a total of 84 other sources, the amount of data that needs to be synchronized is 30×84=2520. It takes about 2 ms to write a data, so it takes 2520×2=5040 ms to synchronize 2520 data, that is, about 5 s. When the user has selected the item for applying to all source items, it takes 84 times to write data to other sources to adjust the menu content again, which takes 84×2=168 ms; and it takes 1.68 s to write data by continuously adjusting 10 menu contents. Then the total time is 5+1.68=6.68 s.

In this embodiment, when the menu content 44 is used, after the user selects the item of application to all the sources and when the user has selected the item of application to all the sources, the menu content of certain item is adjusted again, the synchronization operation is not performed, that is, the UI jamming phenomenon will not occur due to the time consumption caused by the synchronization operation; instead, the synchronization operation is performed after the menu content 44 is closed, so that the user does not feel a delay of 168 ms when a menu content is adjusted, and therefore the user will not feel the influence of the synchronization operation on the UI display and operation.

The foregoing embodiments are provided for purposes of illustration and description and are not intended to be exhaustive or limiting. Individual elements or features of a particular embodiment are not generally limited to that particular embodiment but may be used or interchanged in selected embodiments even if not specifically shown or described where applicable. It is possible to make modifications without departing from the scope of the appended claims and all such modifications are covered within the scope of the appended claims.

What is claimed is:

1. A display apparatus, comprising:
   a display configured to display an image and/or a user interface;
   a user input interface, configured to receive a user input;
   an external device interface, configured to connect with one or more external devices that provide contents;
   a network connection component, configured to connect with network;
   a memory configured to store instructions and data associated with the display; and a controller, in connection with the display, the user input interface, the external device interface and configured to execute the instructions to cause the display apparatus to:

while a content provided by a first input source is displaying on the display, in response to a first instruction for showing a setting menu of display parameters, present a first graphical user interface that comprises the setting menu of display parameters for the first input source on the display;

in response to a second instruction for modifying at least one display parameter in the setting menu of display parameters, modify data of the at least one display parameter and store the modified data associated with the at least one display parameter in the first input source; and in response to a third instruction for selecting a first function option in the setting menu of display parameters, write and store the modified data associated with the at least one display parameter for the first input source in other input sources except the first input source.

2. The display apparatus according to claim 1, wherein the controller is further configured to execute the instructions to cause the display apparatus to:

while the content provided by the first input source is displaying on the display, in response to a fourth instruction for modifying a first display parameter in the setting menu of display parameters immediately after the third instruction, modify data of the first display parameter, and write and store the modified data of the first display parameter in all the input sources including the first input source and the other input sources.

3. The display apparatus according to claim 1, wherein the controller is further configured to execute the instructions to cause the display apparatus to:

in response to a fifth instruction for switching the first input source to a second input source, display a content provided by the second input source on the display; and while the content provided by the second input source is displaying on the display, in response to a sixth instruction for showing a setting menu of display parameters, present a second graphical user interface that comprises the setting menu of display parameters on the display;

wherein data associated with the at least one display parameter in the setting menu of display parameters in the second input source is the same as the modified data associated with the at least one display parameter in the first input source.

4. The display apparatus according to claim 1, wherein the first input source is an input source associated with one of the one or more external devices.

5. The display apparatus according to claim 1, wherein the second input source is an input source associated with one of the one or more external devices.

6. The display apparatus according to claim 1, wherein the display parameters are parameters associated with an image quality of the display.

7. The display apparatus according to claim 3, wherein a signal type of an input content from the second input source is the same as a signal type of an input content from the first input source.

8. The display apparatus according to claim 2, wherein the controller is further configured to execute the instructions to cause the display apparatus to:

in response to the third instruction for selecting the first function option in the setting menu of the display parameters, set and store an indicator for indicating the first function option has been selected.

9. The display apparatus according to claim 8, wherein the controller is further configured to execute the instructions to cause the display apparatus to:

in response to the fourth instruction for modifying the first display parameter in the setting menu of display parameters, read the indicator associated with the first function option stored; and in response to the indicator indicating that the first function option has been selected, write and store the modified data of the first display parameter in all the input sources.

10. The display apparatus according to claim 8, wherein the controller is further configured to execute the instructions to cause the display apparatus to:

in response to determining no longer modifying the at least one display parameter in the setting menu of the display parameters, read the indicator associated with the first function option stored; and in response to the indicator indicating that the first function option has been selected, write and store the modified data of the first display parameter in all the input sources.

11. The display apparatus according to claim 8, wherein the controller is further configured to execute the instructions to cause the display apparatus to:

in response to a seventh instruction for exiting from the setting menu of display parameters in the first input source, read the indicator associated with the first function option; and in response to the indicator indicating that the first function option has been selected, write and store data of current setting of display parameters for the first input source in other input sources except the first input source, and exit from the setting menu of display parameters in the first input source.

12. The display apparatus according to claim 1, wherein the at least one display parameter comprises one or more of backlight, contrast, brightness, color and sharpness.

13. The display apparatus according to claim 1, wherein the setting menu of display parameters comprises a picture setting menu.

14. A process method for a display apparatus, comprising:

while a content provided by a first input source is displaying on a display of the display apparatus, in response to a first instruction for showing a setting menu of display parameters, presenting a first graphical user interface that comprises the setting menu of display parameters for the first input source on the display, wherein the display apparatus comprises the display for displaying an image, a user input interface configured for receiving a user input; an external device interface, configured for connecting with one or more external devices that provide contents; a network connection component configured for connecting with network;

in response to a second instruction for modifying at least one display parameter in the setting menu of display parameters, modifying data of the at least one display parameter and storing the modified data associated with the at least one display parameter in the first input source; and in response to a third instruction for selecting a first function option in the setting menu of display parameters, writing and storing the modified data associated with the at least one display parameter for the first input source in other input sources except the first input source.

15. The method according to claim 14, further comprising:
while the content provided by the first input source is displaying on the display, in response to a fourth instruction for modifying a first display parameter in the setting menu of display parameters immediately after the third instruction, modifying data of the first display parameter, and writing and storing the modified data of the first display parameter in all the input sources including the first input source and the other input sources.

16. The method according to claim 14, further comprising in response to a fifth instruction for switching the first input source to a second input source, displaying a content provided by the second input source on the display; and
while the content provided by the second input source is displaying on the display, in response to a sixth instruction for showing a setting menu of display parameters, presenting a second graphical user interface that comprises the setting menu of display parameters on the display;
wherein data associated with the at least one display parameter in the setting menu of display parameters in the second input source is the same as the modified data associated with the at least one display parameter in the first input source.

17. The method according to claim 14, wherein the first input source is an input source associated with one of the one or more external devices.

18. The method according to claim 14, wherein the second input source is an input source associated with one of the one or more external devices.

19. The method according to claim 14, wherein the at least one display parameters comprises one or more of backlight, contrast, brightness, color and sharpness.

20. The method according to claim 14, wherein the setting menu of display parameters comprises a picture setting menu.

* * * * *